United States Patent
Halder et al.

(10) Patent No.: US 12,449,280 B2
(45) Date of Patent: Oct. 21, 2025

(54) SENSOR APPARATUS AND OPERATING METHOD THEREFOR

(71) Applicant: NOVOTECHNIK MESSWERTAUFNEHMER OHG, Ostfildern (DE)

(72) Inventors: Ernst Halder, Stuttgart (DE); Torsten Wegner, Wiesbaden (DE)

(73) Assignee: Novotechnik Messwertaufnehmer OHG, Ostfildern (DE)

( * ) Notice: Subject to any disclaimer, the term of this patent is extended or adjusted under 35 U.S.C. 154(b) by 846 days.

(21) Appl. No.: 17/422,417

(22) PCT Filed: Jan. 24, 2020

(86) PCT No.: PCT/EP2020/051757
§ 371 (c)(1),
(2) Date: Jul. 12, 2021

(87) PCT Pub. No.: WO2020/164882
PCT Pub. Date: Aug. 20, 2020

(65) Prior Publication Data
US 2022/0120587 A1    Apr. 21, 2022

(30) Foreign Application Priority Data
Feb. 12, 2019  (DE) .......... 102019103522.8

(51) Int. Cl.
*G01D 5/14*    (2006.01)
*G01R 33/07*   (2006.01)
*G01R 33/09*   (2006.01)

(52) U.S. Cl.
CPC .......... *G01D 5/145* (2013.01); *G01R 33/072* (2013.01); *G01R 33/093* (2013.01); *G01R 33/098* (2013.01)

(58) Field of Classification Search
CPC .... G01D 5/145; G01R 33/072; G01R 33/093; G01R 33/098
See application file for complete search history.

(56) References Cited

U.S. PATENT DOCUMENTS 6,545,463 B1    4/2003  Dettmann et al.
10,228,267 B2 *  3/2019  Mattheis .............. G01R 33/098
(Continued)

FOREIGN PATENT DOCUMENTS

CN    1754080 A      3/2006
CN    102822638 A    12/2012
(Continued)

OTHER PUBLICATIONS

PCT/EP2020/051757. International Search Report (Jul. 30, 2020).
(Continued)

*Primary Examiner* — Reena Aurora
(74) *Attorney, Agent, or Firm* — Jessica Smith; LOZA & LOZA, LLP

(57) ABSTRACT

An apparatus, in particular a sensor apparatus, comprising a magnet arrangement which extends along a longitudinal axis for generating a magnetic field and is configured to generate the magnetic field with at least a first radial magnetic field component varying along the longitudinal axis, and a magnetic sensor device which is arranged movably relative to the magnet arrangement along the longitudinal axis and comprises a first magnetic sensor and a second magnetic sensor.

20 Claims, 19 Drawing Sheets

(56) References Cited

U.S. PATENT DOCUMENTS

Figure 1:
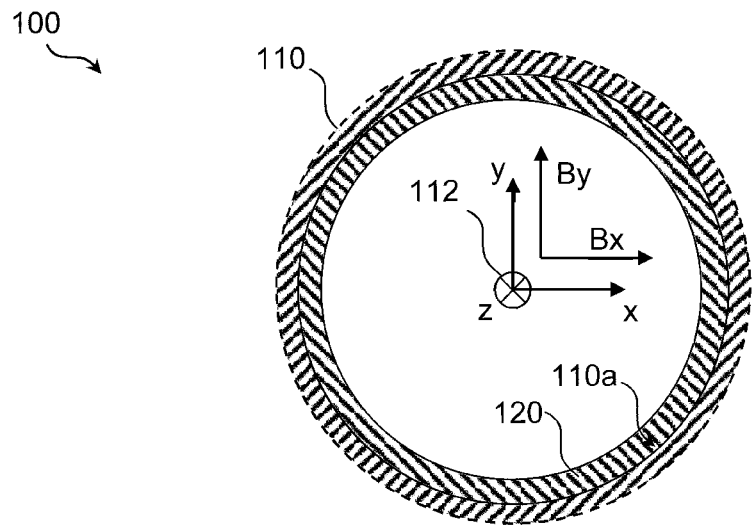

| | | | |
|---|---|---|---|
| 11,448,524 B2 * | 9/2022 | Kaste | ............... G01D 5/2451 |
| 2003/0000307 A1 | 1/2003 | Lohberg | |
| 2006/0192553 A1 | 8/2006 | Recio et al. | |
| 2007/0080683 A1 | 4/2007 | Bartos et al. | |
| 2007/0285087 A1 | 12/2007 | Diegel et al. | |
| 2009/0322320 A1 * | 12/2009 | Hatanaka | ......... B62D 15/0215 |
| | | | 324/207.25 |
| 2011/0074399 A1 | 3/2011 | Bartos et al. | |
| 2013/0015846 A1 | 1/2013 | Mehnert et al. | |
| 2013/0113469 A1 | 5/2013 | Wallrafen | |
| 2015/0137796 A1 | 5/2015 | Ausserlechner | |
| 2016/0216133 A1 | 7/2016 | Ausserlechner | |
| 2018/0172477 A1 | 6/2018 | Dietrich et al. | |

FOREIGN PATENT DOCUMENTS

| | | |
|---|---|---|
| CN | 104655004 A | 5/2015 |
| DE | 19910636 A1 | 9/2000 |
| DE | 10010042 A1 | 7/2001 |
| DE | 10150305 A1 | 10/2002 |
| DE | 110150305 A1 | 10/2002 |
| DE | 102005055905 A1 | 5/2007 |
| DE | 102008063226 A1 | 7/2010 |
| DE | 102010010893 A1 | 9/2010 |
| DE | 102010019077 A1 | 11/2011 |
| DE | 102015210586 A1 | 12/2016 |
| DE | 102015225316 A1 | 6/2017 |
| DE | 102017222674 A1 | 7/2018 |
| JP | H0749245 A | 2/1995 |
| TW | 201947185 A | 12/2019 |
| WO | 0151893 A1 | 7/2001 |

OTHER PUBLICATIONS 202080012847.5, Chinese Office Action dated Aug. 3, 2023. (15 pages).
TW11021173500. Taiwanese Office Action dated Nov. 29, 2021. (4 pages).
Chinese Office Action dated Apr. 20, 2024 for Chinese application No. 202080012847.5, 15 pages.

* cited by examiner

Fig. 9

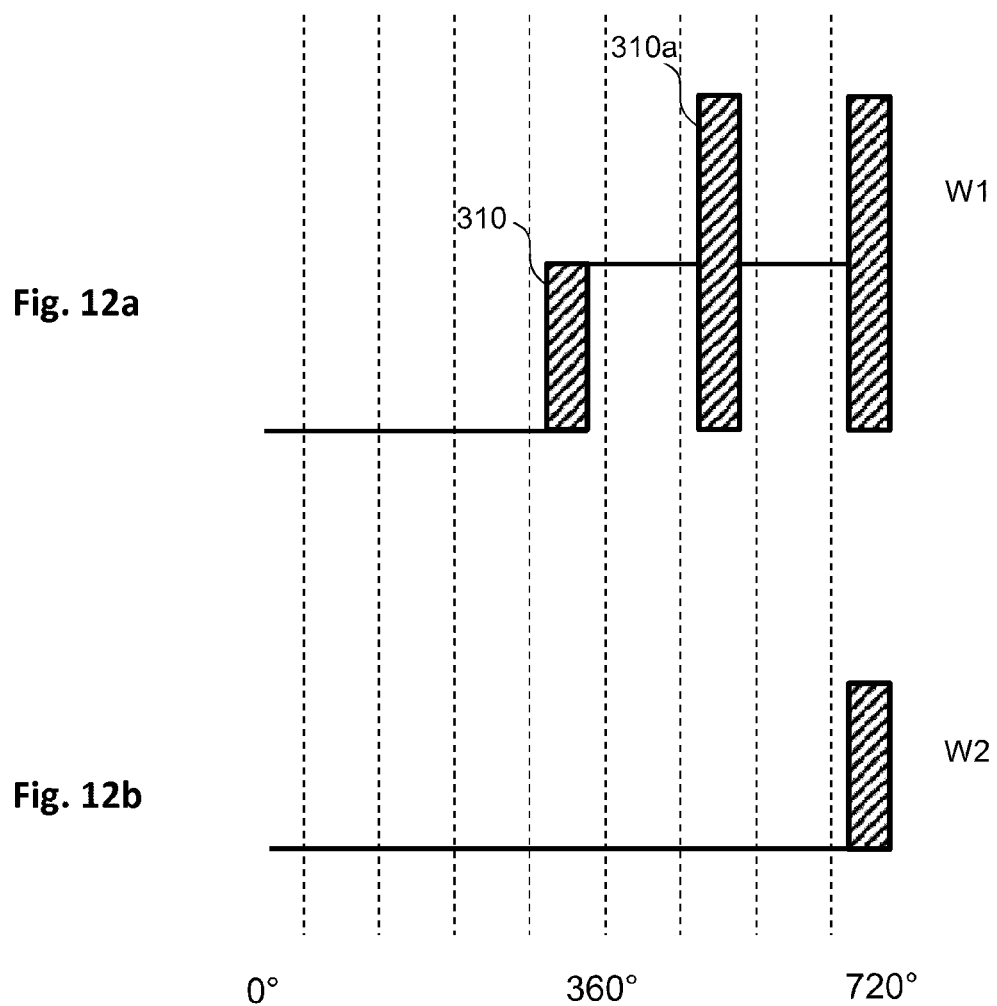

Fig. 14a
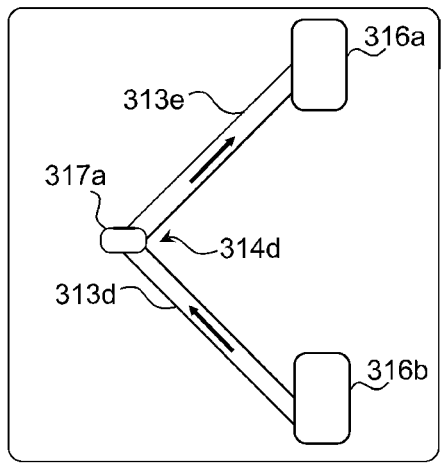
Fig. 14b
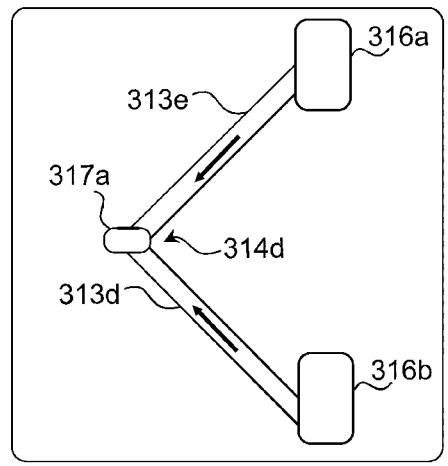
Fig. 14c
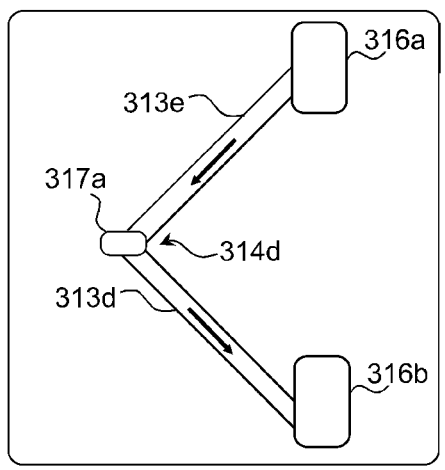
Fig. 14d
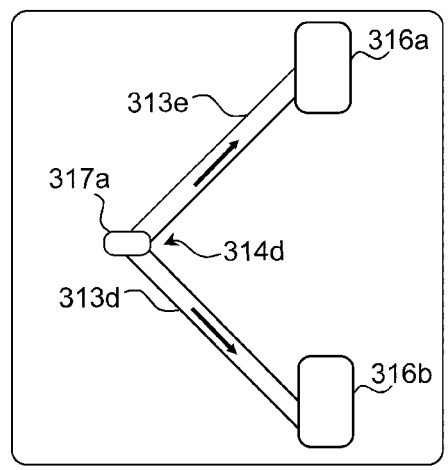
Fig. 15a
Fig. 15b
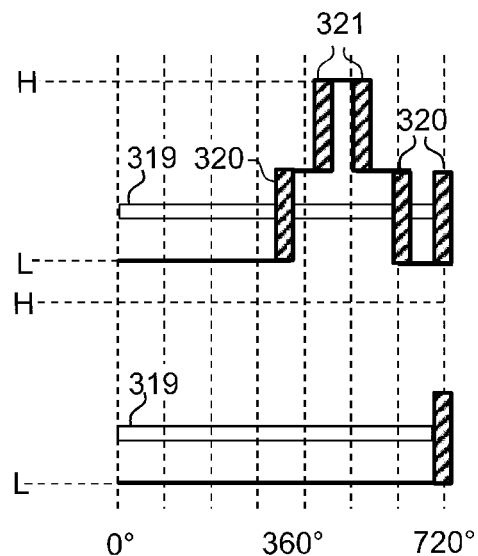

SENSOR APPARATUS AND OPERATING METHOD THEREFOR

SUMMARY

State of the Art

The disclosure relates to an apparatus, in particular a sensor apparatus. The disclosure further relates to an operating method for such an apparatus.

Disclosure of the Invention

Preferred embodiments relate to an apparatus, in particular a sensor apparatus, comprising a magnet arrangement which extends along a longitudinal axis for generating a magnetic field and is configured to generate the magnetic field with at least a first radial magnetic field component (e.g., perpendicular to a longitudinal axis) varying along the longitudinal axis, and a magnetic sensor device which is arranged movably relative to the magnet arrangement along the longitudinal axis and comprises a first magnetic sensor (131) and a second magnetic sensor. This enables a particularly precise determination of the at least one first radial magnetic field component varying along the longitudinal axis.

In other preferred embodiments, the apparatus comprises a support for receiving the magnet arrangement.

In other preferred embodiments, the support is formed in a substantially hollow cylindrical shape, wherein preferably the magnet arrangement is arranged radially inside of the support. An arrangement of the magnet arrangement radially outside of the support is also possible in further embodiments.

In other preferred embodiments, the optional support may also have a basic shape other than the exemplarily mentioned hollow cylindrical shape, e.g. cuboid shape or band shape (i.e. cuboid shape with substantially greater length than width and height and preferably different width and height) or rod shape or the like.

In other preferred embodiments, the magnet arrangement can be arranged statically (i.e. fixedly or in a stationary manner), in particular can be attached to a or the support and/or to a target system, wherein in particular the sensor device can be moved relative to the magnet arrangement, in particular at least along the longitudinal axis.

In other preferred embodiments, the sensor device can be arranged statically, in particular can be fastened to a target system, or is fastened, wherein in particular the magnet arrangement can be moved relative to the sensor device, in particular at least along the longitudinal axis.

In other preferred embodiments, the magnet arrangement is movable, in particular at least along the longitudinal axis, wherein the sensor device is also movable, in particular at least along the longitudinal axis, relative to the magnet arrangement.

Other preferred embodiments relate to an apparatus, in particular a sensor apparatus, comprising a substantially hollow cylindrical support having a longitudinal axis, a magnet arrangement axis for generating a magnetic field which is preferably arranged radially inside of the support and extends along the longitudinal and is configured to generate the magnetic field with at least a first radial magnetic field component varying along the longitudinal axis, and a magnetic sensor device which is preferably arranged radially inside of the magnet arrangement and is, along the longitudinal axis, in particular movable back and forth and comprises a first magnetic sensor and a second magnetic sensor.

In other preferred embodiments, the first magnetic sensor has a first sensor type, wherein the second magnetic sensor has a second sensor type different from the first sensor type. This provides further degrees of freedom for determining the at least one first radial magnetic field component that varies along the longitudinal axis.

In other preferred embodiments, the magnet arrangement is configured to generate the magnetic field with the at least one first radial magnetic field component varying along the longitudinal axis and with a second radial magnetic field component, which is preferably perpendicular to the first radial magnetic field component, varying along the longitudinal axis. This advantageously provides two radial magnetic field components, in particular perpendicular to each other, which vary along the longitudinal axis of the support and thus advantageously enable, for example, an efficient determination of a position of the sensor device.

In other preferred embodiments, the first radial magnetic field component and/or the second radial magnetic field component varies sinusoidally or cosinusoidally at least in certain regions along the longitudinal axis. This enables a particularly precise determination of the position of the sensor device.

In other preferred embodiments, the first radial magnetic field component and/or the second radial magnetic field component vary non-sinusoidally or non-cosinusoidally along the longitudinal axis, for example linearly, respectively, optionally also with different gradients. This also enables a particularly precise determination of the position of the sensor device.

In other embodiments, combinations of at least one (co)sinusoidal course of the first radial magnetic field component and a non-(co)sinusoidal (e.g. linear) course of the second radial magnetic field component are also conceivable.

In other preferred embodiments, the first radial magnetic field component and/or the second radial magnetic field component vary at least approximately linearly at least in certain regions along the longitudinal axis.

In other preferred embodiments, the magnet arrangement is arranged on a radial inner surface of the support, wherein in particular the magnet arrangement covers the radial inner surface of the support to at least about 40 percent, further in particular to at least about 90 percent, and particularly preferably to at least about 95 percent.

In other preferred embodiments, the magnet arrangement comprises a magnetizable or magnetized material which is magnetized along the longitudinal axis in such a way, in particular differently, that the first and/or second radial magnetic field component varying along the longitudinal axis results.

In other preferred embodiments, the magnet arrangement comprises at least one magnetic element having a substantially ribbon-like basic shape. For example, the substantially ribbon-like basic shape may have a substantially rectangular cross-section with a length and a width, the width being greater than the length, in particular the width being at least twice as great as the length.

In other preferred embodiments, the at least one magnetic element is arranged at least approximately helically along a or the radial inner surface of the support.

In other preferred embodiments, at least two magnetic elements are arranged at least approximately helically along a or the radial inner surface of the support.

In other preferred embodiments, the at least one magnetic element is arranged at least approximately parallel to the longitudinal axis of the support.

In other preferred embodiments, at least two magnetic elements are arranged at least approximately parallel to the longitudinal axis of the support.

In other preferred embodiments, the support comprises a material and/or a coating with a material which has a relative permeability of about 100 or more, particularly about 1000 or more, further particularly about 2000 or more.

In other preferred embodiments, the first magnetic sensor and the second magnetic sensor are both arranged in the region of the longitudinal axis, in particular on the longitudinal axis or on a virtual straight line which is parallel to the longitudinal axis.

In other preferred embodiments, the first magnetic sensor and the second magnetic sensor are arranged one behind the other on the longitudinal axis.

In other preferred embodiments, the first magnetic sensor is a magnetic revolution counter, which is in particular configured to determine an integer multiple of a relative revolution of the magnetic sensor with respect to the at least one first radial magnetic field component.

In other preferred embodiments, the second magnetic sensor is a Hall sensor which is in particular configured to determine the at least one first radial magnetic field component, wherein further in particular the second magnetic sensor is configured to determine the first radial magnetic field component and the second radial magnetic field component.

However, in further embodiments, two magnetic sensors of the Hall sensor type may also be provided.

In other preferred embodiments, an evaluation unit is provided which is configured to evaluate output signals of the first and second magnetic sensors.

In other preferred embodiments, the evaluation unit is configured to determine a position of the sensor device with respect to a coordinate, corresponding to the longitudinal axis, of the magnetic element and/or of a or the support.

In other preferred embodiments, the first magnetic sensor configured as a magnetic revolution counter has the following configuration, hereinafter also denoted as "revolution counter type 1": at least one sensor element having a layered structure capable of causing, without a power supply, a change in magnetization in the sensor element when a magnetic field is moved past the sensor element and storing a plurality of such changes, wherein the sensor element comprises a spiral-shaped structure provided with the layered structure.

In other preferred embodiments, a 180-degree wall is created in the spiral-shaped structure when a magnetic field is moved past the sensor element. In other preferred embodiments, a plurality of 180-degree walls can be stored in the spiral-shaped structure. In other preferred embodiments, one end of the spiral-shaped structure is connected to a region denoted as a wall generator. In other preferred embodiments, the wall generator is formed as an approximately circular area. In other preferred embodiments, the wall generator is connected to a first electrical contact. In other preferred embodiments, the other end of the spiral-shaped structure is connected to a second electrical contact. In other preferred embodiments, the other end of the spiral-shaped structure is tapered. In other preferred embodiments, the spiral-shaped structure has a layered structure comprising successively at least one soft magnetic layer, at least one non-magnetic layer and at least one hard magnetic layer. In other preferred embodiments, the soft magnetic layer represents a sensor layer in which the magnetization is changed by the passing of a magnetic field, and that the hard magnetic layer represents a reference layer in which the magnetization is not changed by the passing of a magnetic field. In other preferred embodiments, an antiparallel magnetization in a region of the spiral-shaped structure causes an increased electrical resistance in this region. In other preferred embodiments, the magnetization of the reference layer has an orientation approximately parallel to the course of the spiral-shaped structure and always in the same direction of the spiral-shaped structure. In other preferred embodiments, the spiral-shaped structure has a plurality of straight line segments extending approximately parallel to each other, and that the magnetization of the reference layer has an orientation that is aligned approximately parallel to the straight line segments. In other preferred embodiments, the spiral-shaped structure is a double spiral, wherein one of the two spirals is provided for electrical contacting. In other preferred embodiments, the spiral-shaped structure comprises semicircular sections and straight line sections, and that the semicircular sections are short-circuited and form an electrical contact. In other preferred embodiments, the spiral-shaped structure comprises semicircular sections and straight line sections, and that the straight line sections are separately contacted.

In other preferred embodiments, the first magnetic sensor configured as a magnetic revolution counter has the following configuration, hereinafter also referred to as "revolution counter type 2": a loop-like arrangement provided with N turns, comprising a GMR layer stack, into which magnetic 180° domains can be introduced, stored and read out by measuring the electrical resistance, wherein elongated loop sections are provided at a predeterminable angle with respect to the reference direction impressed in the sensor that are provided, preferably centrally, with contacts to which an electrical potential can be applied and which serve serially or in parallel for reading electrical resistance ratios of individual loop sections to further individual contacts provided in curvature regions of the loop-like arrangement, wherein in particular the determined resistance ratios provide a direct measure of the presence or absence of a magnetic domain in the corresponding loop section and thus an unambiguous statement about the number of revolutions occurred. In other preferred embodiments, the orientation of the longitudinal extension of elongated loop sections is parallel to the reference direction in the sensor, wherein the elongated first loop sections are gathered by a first common contact centered on the loop sections and the opposite elongated second loop sections are gathered by a second contact also centered on the loop sections, wherein an electrical potential is applied between these contacts and the serial or parallel reading of the electrical resistance ratios of loop sections to further individual contacts provided at least on one side in a curvature region of the loops is carried out. In other preferred embodiments, the orientation of the longitudinal extension of elongated adjacent loop sections extends at an angle in the order of an absolute value of 45° with respect to the reference direction in the sensor, and that contacts, to which an electrical potential can be applied, are provided preferably centrally in said elongated adjacent loop sections and enable the serial or parallel reading of the electrical resistance ratios of individual loop sections with respect to further individual contacts provided in curvature regions of the loop sections. In other preferred embodiments, the entire loop-like arrangement is rhombus-shaped in the top view, wherein the contacts to which an electrical potential can be applied are provided in opposite rhombus corners and the individual contacts provided for a separate resistance ratio measurement are arranged in the respective remaining rhombus corners. In other preferred embodiments, the rhombus-shaped design of the loop-like arrangement is such that adjacent rhombus legs form an angle of 90°. In other preferred embodiments, the rhombus-shaped configuration of the loop-like arrangement is such that the rhombi are distorted in such a way that opposing rhombus corners form an obtuse or acute angle, respectively. In other preferred embodiments, the contacts to which an electrical potential can be applied are structured in themselves and electrically separately contact each loop section to which they are assigned. In other preferred embodiments, all provided electrical contacts are configured to be large enough in area such that un-contacted loop sections of all loops remaining between adjacent contacts have the same length. In other preferred embodiments, it is provided that, in addition to the loop-like arrangement, separated individual non-magnetizable strip sections are provided, each of which is arranged parallel to adjacent closed loop sections.

Further preferred embodiments relate to a method of operating an apparatus, in particular a sensor apparatus, comprising a magnet arrangement which extends along a longitudinal axis for generating a magnetic field and is configured to generate the magnetic field with at least a first radial magnetic field component varying along the longitudinal axis, and a magnetic sensor device which is arranged movably relative to the magnet arrangement along the longitudinal axis and comprises a first magnetic sensor and a second magnetic sensor, wherein the method comprises the following step: moving the sensor device along the longitudinal axis relative to the magnet arrangement.

In other preferred embodiments, the step of moving comprises: a) fixing (making stationary of holding) the magnet arrangement and moving the sensor assembly relative to the magnet arrangement along the longitudinal axis, b) fixing the sensor assembly and moving the magnet arrangement relative to the sensor assembly along the longitudinal axis, c) moving the magnet arrangement and moving the sensor assembly relative to each other along the longitudinal axis.

In other preferred embodiments, the apparatus comprises an evaluation unit which evaluates output signals of the first and second magnetic sensors.

In other preferred embodiments, the evaluation unit determines a position, in particular a relative position, of the sensor device with respect to a coordinate corresponding to the longitudinal axis, in particular of the magnetic element and/or of the support, depending on the output signals of the first and second magnetic sensors.

In other preferred embodiments, the first magnetic sensor and the second magnetic sensor are arranged on the longitudinal axis or on a virtual straight line that is parallel to the longitudinal axis, wherein the evaluation unit is configured to take into account an axial offset of the two magnetic sensors with respect to one another along the longitudinal axis, in particular when determining the position of the sensor device.

In other preferred embodiments, a magnetic revolution counter is used as the first magnetic sensor, which in particular is configured to determine an integer multiple of a relative revolution of the magnetic sensor with respect to the at least one first radial magnetic field component.

In other preferred embodiments, the revolution counter comprises: a loop-like arrangement provided with N turns, comprising a GMR layer stack, into which magnetic 180° domains can be introduced, stored and read out by measuring the electrical resistance, wherein elongated loop sections are provided at a predeterminable angle with respect to the reference direction impressed in the sensor that are provided, preferably centrally, with contacts to which an electrical potential can be applied and which serve serially or in parallel for reading electrical resistance ratios of individual loop sections to further individual contacts provided in curvature regions of the loop-like arrangement, wherein in particular the determined resistance ratios provide a direct measure of the presence or absence of a magnetic domain in the corresponding loop section and thus an unambiguous statement about the number of revolutions occurred.

In other preferred embodiments, the revolution counter comprises: at least one sensor element having a layered structure capable of causing, without a power supply, a change in magnetization in the sensor element when a magnetic field is moved past the sensor element and storing a plurality of such changes, wherein the sensor element comprises a spiral-shaped structure provided with the layered structure.

In other preferred embodiments, a Hall sensor is used as the second magnetic sensor, which is in particular configured to determine the at least one first radial magnetic field component, wherein further in particular the second magnetic sensor is configured to determine the first radial magnetic field component and the second radial magnetic field component, which is preferably perpendicular to the first radial magnetic field component.

Further preferred embodiments relate to a system comprising a movable element and at least one apparatus according to the embodiments, wherein at least one component of the magnet arrangement, in particular a magnetic element of the magnet arrangement, is arranged on the movable element, and wherein in particular the magnetic sensor device is fixedly arranged.

Further preferred embodiments relate to a use of the apparatus according to the embodiments and/or of the method according to the embodiments and/or of the system according to the embodiments in a displacement transducer.

Further features, applications and advantages of the invention can be derived from the following description of embodiments of the invention, which are illustrated in the figures. In this context, all the features described or illustrated, either individually or in any combination, constitute the subject-matter of the invention irrespective of their combination in the claims or their correlation and irrespective of their wording or representation in the description or in the drawings.

Figure 2:
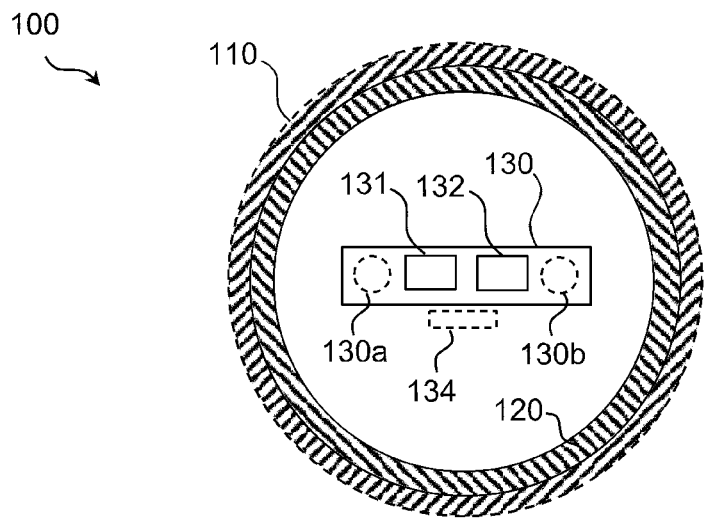
Figure 3:
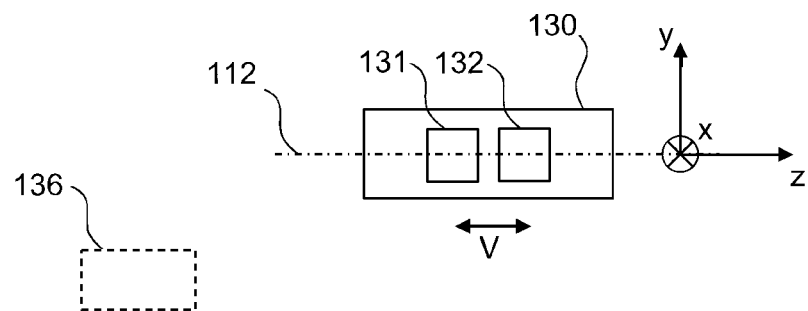
Figure 4A:
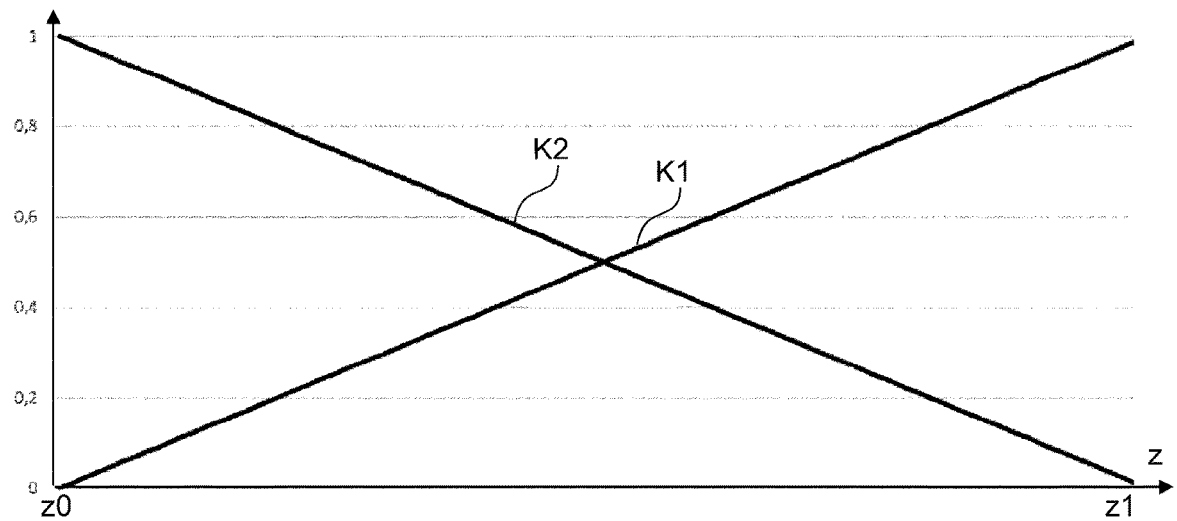
Figure 4B:
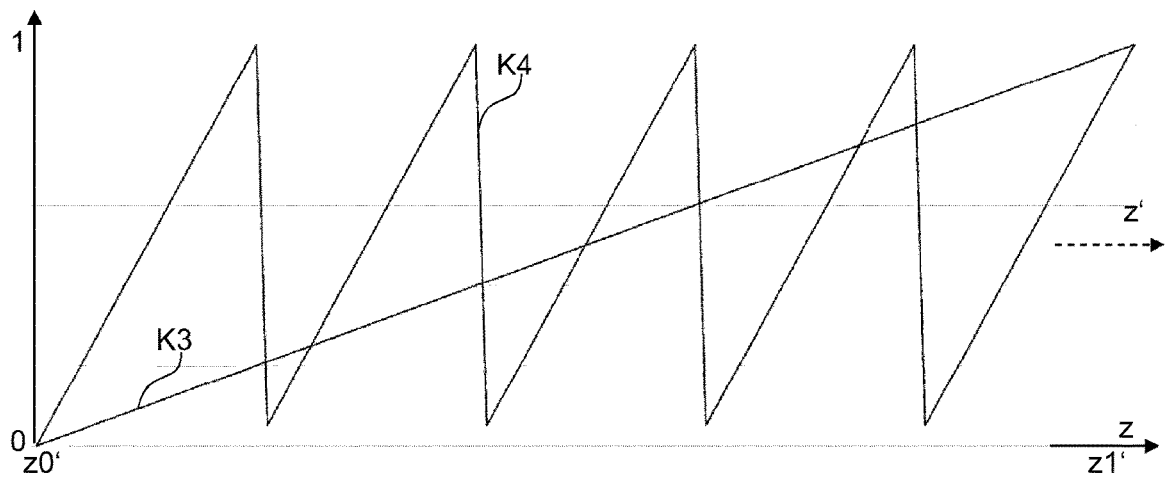
Figure 4C:
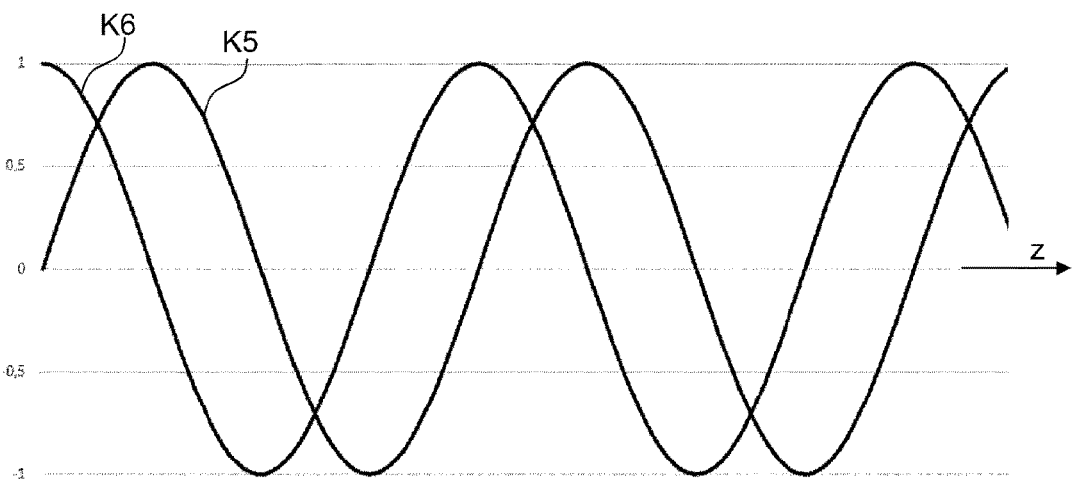
Figure 5:
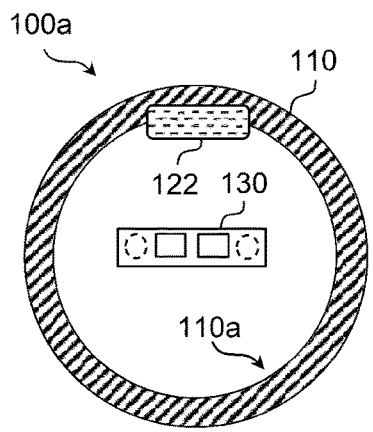
Figure 6:
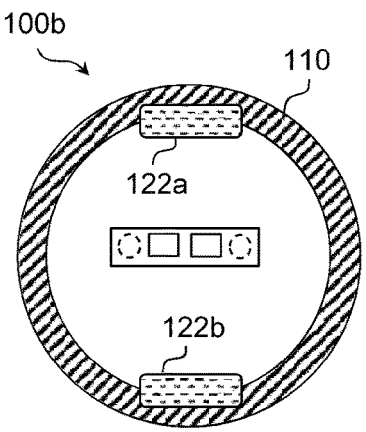
Figure 7:
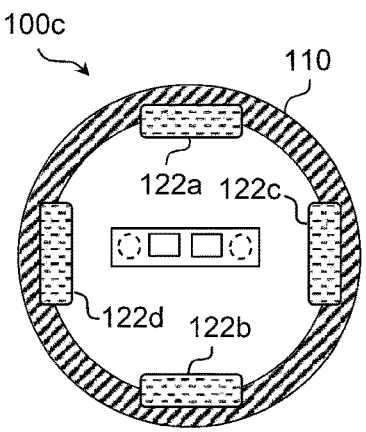
Figure 8A:
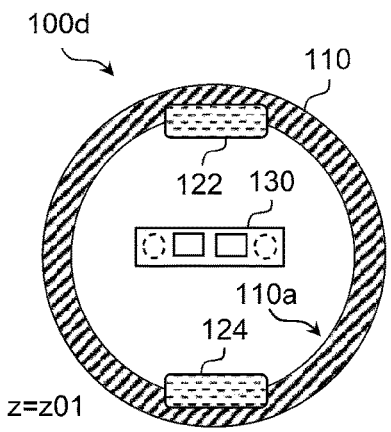
Figure 8B:
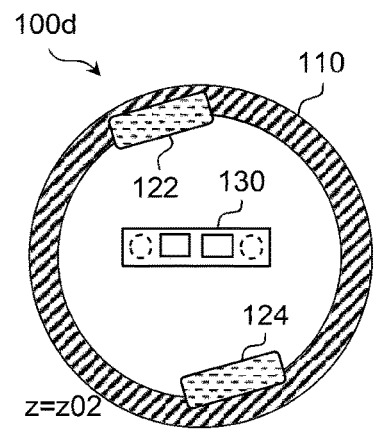
Figure 8C:
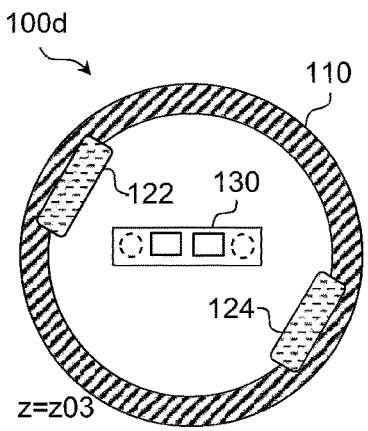
Figure 29:
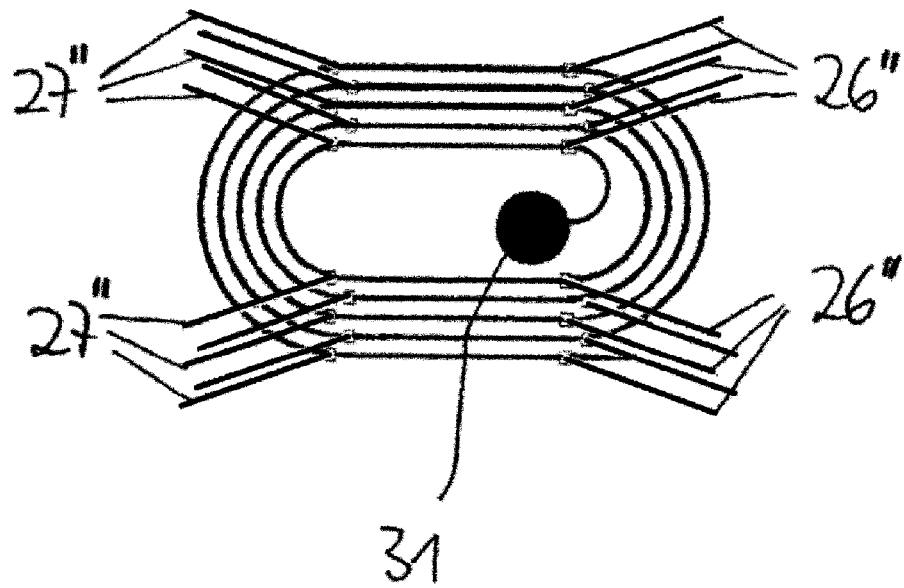
Figure 30A:
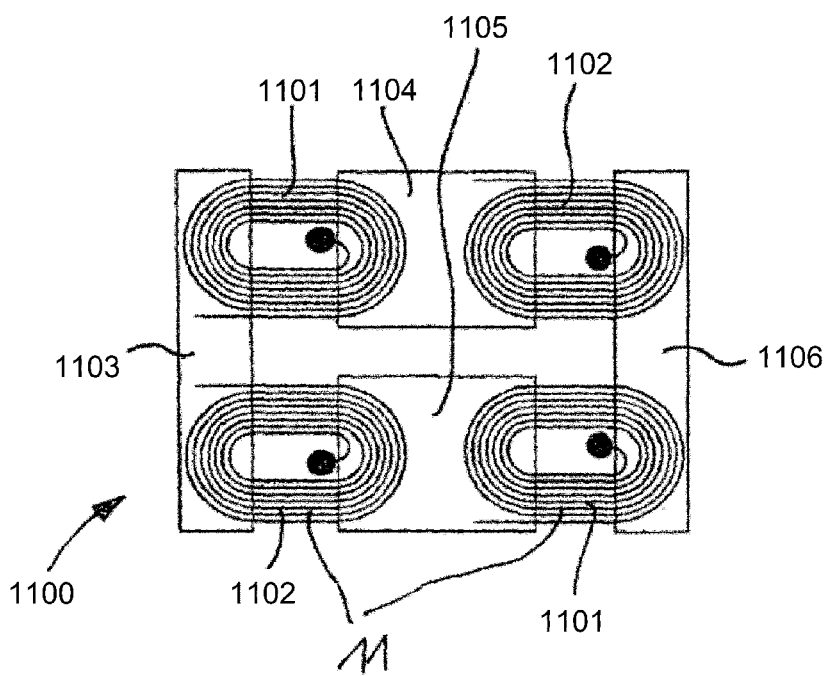
Figure 30B:
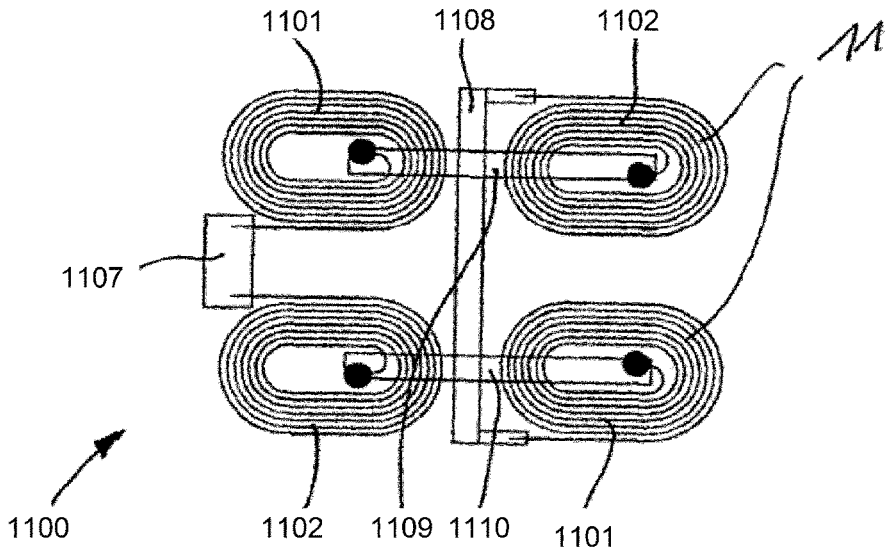
Figure 31:
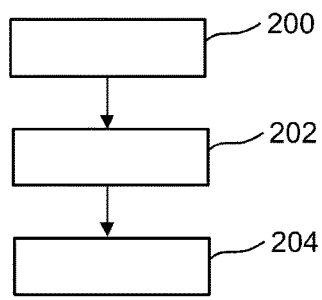
Figure 32A:
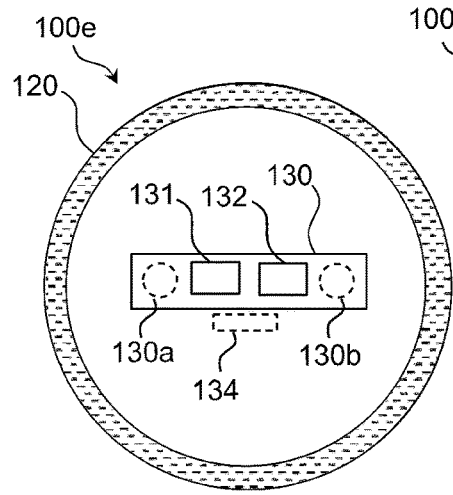
Figure 32B:
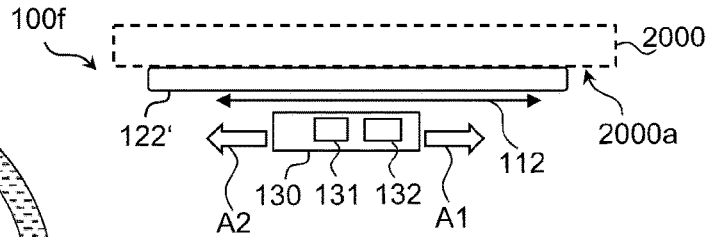
Figure 32C:
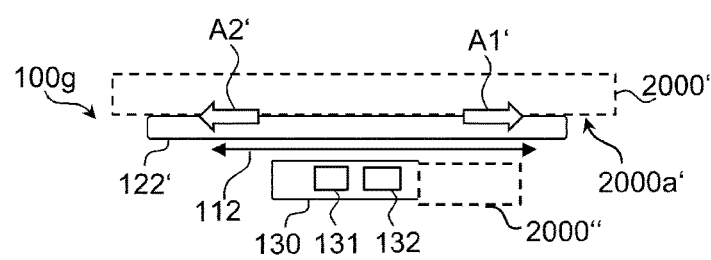

In the drawings:

FIG. 1 schematically shows of an apparatus according to preferred embodiments, partially in cross-section viewed in longitudinal direction, FIG. 2 shows details of the apparatus of FIG. 1, FIG. 3 schematically shows a simplified block diagram of a sensor device according to other preferred embodiments, FIGS. 4A, 4B, 4C each shows operating variables according to other preferred embodiments, FIGS. 5, 6, 7 each schematically show an apparatus according to other preferred embodiments, partially in cross-section, FIGS. 8A, 8B, 8C each schematically show an apparatus according to another preferred embodiment, partially in cross-section, FIG. 9 schematically shows a simplified block diagram of an evaluation unit according to other preferred embodiments, FIGS. 10 to 20 each schematically show aspects of a type of a magnetic revolution counter according to other preferred embodiments, FIGS. 21 to 30b each schematically show aspects of another type of magnetic revolution counter according to other preferred embodiments, FIG. 31 schematically shows a simplified flow diagram of a method according to other preferred embodiments, FIG. 32A schematically shows an apparatus according to other preferred embodiments, partially in cross-section viewed in the longitudinal direction, FIG. 32B schematically shows side view of an apparatus according to other preferred embodiments, and FIG. 32C schematically shows side view of an apparatus according to other preferred embodiments.

FIG. 1 schematically shows an apparatus 100 according to preferred embodiments, partially in cross-section viewed in the longitudinal direction.

Apparatus 100 comprises an optional, in the present example substantially hollow cylindrical, support 110 with a longitudinal axis 112 which is aligned perpendicular to the drawing plane of FIG. 1 and in this respect corresponds to the coordinate z, wherein a horizontal coordinate in FIG. 1 is provided with the reference sign x and a vertical coordinate in FIG. 1 is provided with the reference sign y. Apparatus 100 further comprises a magnet arrangement 120 which is preferably arranged radially inside of the optional support 110 and extends along longitudinal axis 112 for generating a magnetic field and is configured to generate the magnetic field with at least a first radial magnetic field component Bx (radial magnetic field component along the coordinate x) varying along longitudinal axis 112 (i.e. along the z coordinate).

In further, particularly preferred embodiments described below, for example with reference to FIG. 32, no optional support 110 (FIG. 1) is provided, and longitudinal axis 112 corresponds, for example, substantially to the longitudinal axis of magnet arrangement 120 or to a virtual straight line parallel thereto.

Furthermore, apparatus 100 according to FIGS. 1, 2 comprises a magnetic sensor device 130, preferably arranged radially inside of magnet arrangement 120 and movable, in particular back and forth, along longitudinal axis 112 which is illustrated in the view of FIG. 2. Sensor device 130 comprises a first magnetic sensor 131 and a second magnetic sensor 132. This enables a particularly precise determination of the at least one first radial magnetic field component Bx varying along the longitudinal axis 112. Sensor device 130 is preferably arranged so as to be movable or traversable back and forth along longitudinal axis 112 of the support by means of a sliding guide 130a, 130b. Optionally, a circuit support plate 134 may also be provided, e.g. for electrical contacting of at least one component of the sensor device 130.

In other preferred embodiments, first magnetic sensor 131 has a first sensor type, wherein second magnetic sensor 132 has a second sensor type different from the first sensor type. This provides further degrees of freedom for determining the at least one first radial magnetic field component Bx varying along longitudinal axis 112.

In other preferred embodiments, magnet arrangement 120 is configured to generate the magnetic field with the at least one first radial magnetic field component Bx varying along longitudinal axis 112 and a second radial magnetic field component By (FIG. 1), which is preferably perpendicular to the first radial magnetic field component Bx and varies along longitudinal axis 112 (in the same way or in particular in a different way). This advantageously provides two, in particular mutually perpendicular, radial magnetic field components Bx, By which vary along longitudinal axis 112 of support 110 and thus advantageously enable an efficient determination of a position of sensor device 130, for example.

In other preferred embodiments, the first radial magnetic field component Bx and/or the second radial magnetic field component By vary non-sinusoidally or non-cosinusoidally along longitudinal axis 112 or z coordinate, for example linearly in each case, optionally also with different gradients. This enables a particularly precise determination of the position of sensor device 130.

FIG. 4A shows an example in the form of curve K1 (plotted in any unit, e.g. normalized magnitude of the magnetic field strength as a function of the coordinate z) a course of the first radial magnetic field component Bx along longitudinal axis 112 or z-coordinate of support 110, i.e. along a perpendicular to the drawing plane of FIG. 1. As can be seen, curve K1 increases linearly from a minimum value "0" at the z coordinate z0 to a maximum value "1" at the z coordinate z1.

Curve K2 gives an example of a course of the second, optional radial magnetic field component By (plotted in any unit, e.g. normalized magnitude of the magnetic field strength as a function of coordinate z) along the z-coordinate of support 110. As can be seen, the curve K2 decreases linearly from a maximum value "1" at the z coordinate z0 to a minimum value "0" at the z coordinate z1. By evaluating the first radial magnetic field component Bx and/or the second radial magnetic field component By using the two sensors 131, 132, a current position "z" of sensor device 130 along the coordinate z within support 110 can be advantageously concluded by means of sensor device 130 (FIG. 2).

FIG. 4B shows an example of possible courses (curves) of the first radial magnetic field component Bx, cf. curve K3, and the optional second radial magnetic field component By, cf. curve K4, along the coordinate z. As can be seen, curve K3 rises linearly from a minimum value "0" at the z coordinate z0' to a maximum value "1" at the z coordinate z1'. In contrast, curve K4 increases linearly several times within the same interval (z0', z1') from a minimum value, which is not specified for reasons of clarity, to a maximum value, which is also not specified. Accordingly, curve K4 alone does not allow unambiguous determination of the position of sensor device 130 in the considered interval (z0', z1'), which corresponds, for example, at least approximately to a length of support 110. Taking curve K3 into account, however, unambiguousness can be established at least in the considered interval (z0', z1').

In further embodiments, it is also conceivable that magnetic field arrangement 120 is designed such that at least one radial magnetic field component can have negative values at least temporarily (i.e. at least in sections in some regions along the z coordinate). This is indicated in the present case by the further coordinate axis which is vertically displaced with respect to the axis z according to FIG. 4B.

In other preferred embodiments, cf. FIG. 4C, the first radial magnetic field component Bx and/or the second radial magnetic field component By vary sinusoidally or cosinusoidally at least in certain regions along longitudinal axis 112, cf. curves K5, K6. This also enables a particularly precise determination of the position of sensor device 130.

In further embodiments, combinations of at least one (co)sinusoidal course of the first radial magnetic field component and a non-(co)sinusoidal (e.g. linear) course of the second radial magnetic field component are also conceivable.

In other preferred embodiments, magnet arrangement 120 (FIG. 1) is arranged on a radial inner surface 110a of support 110, wherein in particular magnet arrangement 120 covers radial inner surface 110a of the support to at least about 40 percent, further in particular to at least about 90 percent, and particularly preferably to at least about 95 percent.

In other preferred embodiments, magnet arrangement 120 comprises a magnetizable or magnetized material that is magnetized along longitudinal axis 112 (corresponding to the coordinate z) in such a way, in particular differently, that the first and/or second radial magnetic field components Bx, By varying along longitudinal axis 112, cf. FIGS. 4A, 4B, 4C, are obtained. For example, magnet arrangement 120 may be provided in the form of a coating of inner surface 110a which, after being applied to inner surface 110a of support 110, is magnetized in a desired manner, cf. e.g. FIGS. 4A, 4B, 4C.

In other preferred embodiments, cf. FIG. 3, first magnetic sensor 131 and second magnetic sensor 132 are both arranged in the region of longitudinal axis 112, in particular on longitudinal axis 112 or on a virtual straight line parallel thereto, thereby resulting in a particularly precise determination of the position z along longitudinal axis 112 or the z coordinate.

In other preferred embodiments, first magnetic sensor 131 and second magnetic sensor 132 are arranged one behind the other on longitudinal axis 112 or the virtual straight line mentioned, thereby resulting in an offset V along the longitudinal direction, which can be advantageously taken into account, if necessary, in the evaluation of output signals of sensors 131, 132 by means of an optional evaluation unit 136.

In other preferred embodiments, cf. apparatus 100a of FIG. 5, magnet arrangement 120 comprises at least one magnetic element 122 having a substantially ribbon-like basic shape. Magnetic element 122 is arranged at least approximately parallel to longitudinal axis 112 of optional support 110. For example, the substantially ribbon-like basic shape 122 may have a substantially rectangular cross-section with a length (along the y-coordinate of FIG. 1) and a width (along the x-coordinate of FIG. 1), the width being greater than the length, in particular the width being at least twice the length. Magnetic element 122 is arranged, for example, on inner surface 110a, e.g., inserted into a groove (not shown) formed therein. In other preferred embodiments, based on the configuration 100a shown in FIG. 5, optional support 110 may also be omitted, with magnetic element 122 being attachable or secured, for example, to a target system into which apparatus 100a is to be installed or with which apparatus 100a is to be used. In other preferred embodiments, magnetic element 122 may be fixed or attached to the target system, and sensor device 130 is configured to be movable (along longitudinal axis 112) relative to the fixed magnetic element 122. In other preferred embodiments, sensor device 130 may alternatively be fixed or attached in a stationary manner, e.g., to the target system (not shown in FIG. 5), and magnetic element 122 is configured to be movable (together with a component of the target system, if applicable) relative to the stationary sensor device 130 (along longitudinal axis 112).

In other preferred embodiments, cf. apparatus 100b of FIG. 6, two substantially band-shaped magnetic elements 122a, 122b are provided. Both magnetic elements 122a, 122b are arranged at least approximately parallel to longitudinal axis 112 of support 110. In other preferred embodiments, based on the configuration 100b illustrated in FIG. 6, the optional support 110 can also be omitted, in which case what has been said above with reference to FIG. 5 applies accordingly to the attachment of magnetic elements 122a, 122b to a target system, for example, and/or to a stationary attachment or to an individual movability of components 122a, 122b, 130.

In other preferred embodiments, cf. apparatus 100c of FIG. 7, four substantially band-shaped magnetic elements 122a, 122b, 122c, 122d are provided. In the present embodiment, all four magnetic elements 122a, 122b, 122c, 122d are arranged at least approximately parallel to longitudinal axis 112 of support 110. In other preferred embodiments, starting from the configuration 100c illustrated in FIG. 7, the optional support 110 can also be omitted, in which case what has been said above with reference to FIGS. 5, 6 applies accordingly to the attachment of magnetic elements 122a, 122b, 122c, 122d to a target system, for example, and/or to a stationary attachment or to an individual movability of components 122a, 122b, 122c, 122d, 130.

Advantageously, some or all of the respectively provided magnetic elements of FIGS. 5, 6, 7 are magnetized along the longitudinal direction 112 (z coordinate) in such a way that a course of at least one radial magnetic field component Bx, By (FIG. 1) along longitudinal direction 112 (z coordinate) corresponding to FIG. 4A and/or FIG. 4B and/or FIG. 4C results. For example, the four magnetic elements 122a, 122b, 122c, 122d can advantageously be magnetized along their longitudinal axis (and thus also along the longitudinal axis 112 of optional support 110) in such a way that the radial magnetic field components Bx, By (FIG. 1) along longitudinal axis 112 of support 110 have the course corresponding to curves K5, K6 of FIG. 4C.

In other preferred embodiments, cf. apparatus 100d of FIGS. 8A, 8B, 8C, the at least one magnetic element 122, 124 is arranged at least approximately helically along a or the radial inner surface 110a of optional support 110 (i.e., in particular not approximately parallel to longitudinal axis 112, cf. the embodiments according to FIGS. 5, 6, 7). In other preferred embodiments, the optional support 110 may also be omitted, wherein magnetic elements 122, 124 may be arranged or retained directly in a target system for apparatus 100d, for example. In the present example, two magnetic elements 122, 124, which in turn are substantially ribbon-like, are each arranged at least approximately helically on inner surface 110a of support 110, so that for different positions z=z01 (FIG. 8A), z=z02>z01 (FIG. 8B), z=z03>z02 (FIG. 8C) the cross-sections shown in FIGS. 8A, 8B, 8C result. In this embodiment, the two essentially ribbon-like magnetic elements 122, 124 can also have an essentially constant magnetization along their length, for example, since the at least approximately helical arrangement in support 110 results in a magnetic field that rotates with a movement along the z coordinate (in particular rotating radial components Bx, By), which can be determined by sensor device 130, and thereby advantageously a position of sensor device 130 along the z coordinate can be determined.

In other preferred embodiments, support 110 comprises a material and/or a coating with a material having a relative permeability of about 100 or more, in particular of about 1000 or more, further in particular of about 2000 or more. As a result, an external space surrounding the apparatus 100, 100a, 100b, 100c, 100d can be kept substantially free of magnetic fields from magnetic field arrangement 120. At the same time, this shielding enables a precise operation of sensor device 130.

In other preferred embodiments, first magnetic sensor 131 (FIG. 2) is a magnetic revolution counter which is in particular configured to determine an integer multiple of a relative revolution of magnetic sensor 131 with respect to the at least one first radial magnetic field component Bx (or, conversely, an integer multiple of a relative revolution of the first radial magnetic field component Bx with respect to first sensor 131). It should be noted that in preferred embodiments, first sensor 131 (as well as second sensor 132) is not rotatably arranged with respect to support 110 or any other component of apparatus 100, 100a, 100b, 100c, 100d, but is solely movable axially within support 110 along longitudinal axis 112 by means of the sliding guide 130a, 130b (FIG. 2), for example. A relative revolution between the described radial magnetic field components Bx, By or a (radial) sum vector Bx+By thereof and sensors 131, 132 advantageously results solely from the magnetization varying along the z-coordinate as described above, cf. e.g. FIGS. 4A, 4B, 4C, and/or the essentially helical arrangement of magnetic elements 122, 124 (FIG. 8). As a result, during a movement along longitudinal axis 112, sensor device 130 "experiences" a corresponding change, e.g. rotation, of at least one vector Bx, By or of the sum vector Bx+By, which can be evaluated, e.g. by means of the evaluation unit 136, in particular in order to determine the position of sensor device 130 along longitudinal axis 112.

In other preferred embodiments, second magnetic sensor 132 is a Hall sensor that is configured in particular to determine the at least one first radial magnetic field component Bx, By, wherein further in particular second magnetic sensor 132 is configured to determine the first radial magnetic field component Bx and the second radial magnetic field component By.

In other preferred embodiments, already mentioned evaluation unit 136 (FIG. 3) is provided, which is configured to evaluate output signals of first and second magnetic sensors 131, 132, in particular to determine the position of sensor device 130 along longitudinal axis 112.

The combination of a magnetic revolution counter (first sensor 131) with a Hall sensor 132 proposed in particularly preferred embodiments advantageously enables a particularly precise position determination by sensor device 130, while at the same time providing a comparatively large measuring range. For example, the magnetic revolution counter (first sensor 131) can determine complete revolutions of the radial magnetic field vector Bx+By (e.g. corresponding to complete periods of the sinusoidal curve K5 of FIG. 4C), and by means of Hall sensor 132 an exact position within the rotation period of such a revolution of the radial magnetic field vector Bx+By can be determined.

In other preferred embodiments, evaluation unit 136 (FIG. 3) is configured to determine a position of sensor device 130 with respect to a coordinate z of support 110 corresponding to longitudinal axis 112. Thus, apparatus 100, 100a, 100b, 100c, 100d according to the embodiments can advantageously be used to provide a position sensor (position encoder).

FIG. 9 schematically shows a simplified block diagram of an embodiment of evaluation unit 136. Evaluation unit 136 comprises a computing unit 1002, e.g. a microcontroller or microprocessor, and a memory unit 1004 assigned to computing unit 1004 and comprising a volatile memory 1004a (e.g. a working memory, RAM) and/or a non-volatile memory 1004b (e.g. Flash-EEPROM). Memory unit 1004 may store, at least temporarily, at least one computer program PRG which may control an operation of apparatus 100, 100a, . . . , 100d when executed on computing unit 1002. In particular, the computer program PRG may involve the evaluation of the output signals of sensors 131, 132 of sensor device 130, for example in order to determine therefrom the position of sensor device 130 along longitudinal axis 112 or along the z-coordinate.

In other preferred embodiments, first magnetic sensor 131, which according to further particularly preferred embodiments is configured as a magnetic revolution counter, has the following configuration, which is hereinafter also referred to as "revolution counter type 1": at least one sensor element having a layered structure capable of causing, without a power supply, a change in magnetization in the sensor element when a magnetic field is moved past the sensor element and storing a plurality of such changes, wherein the sensor element comprises a spiral-shaped structure provided with the layered structure.

Figure 22:
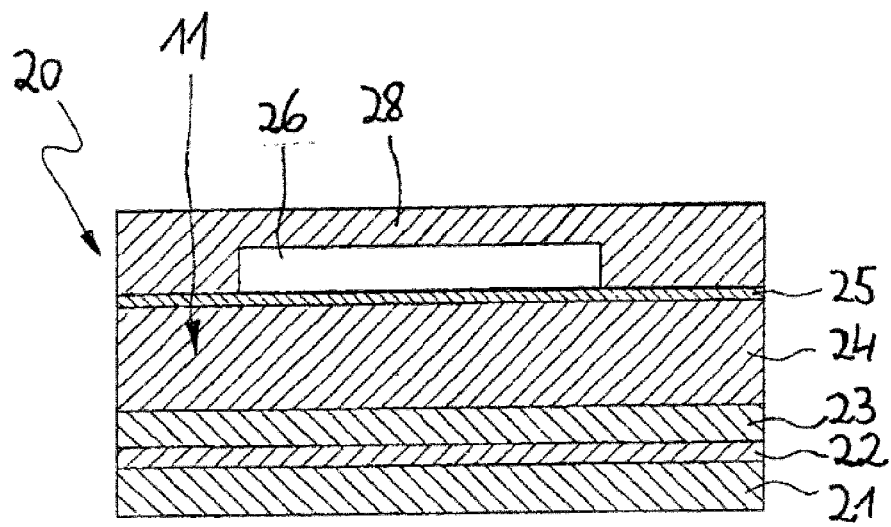
Figure 23:
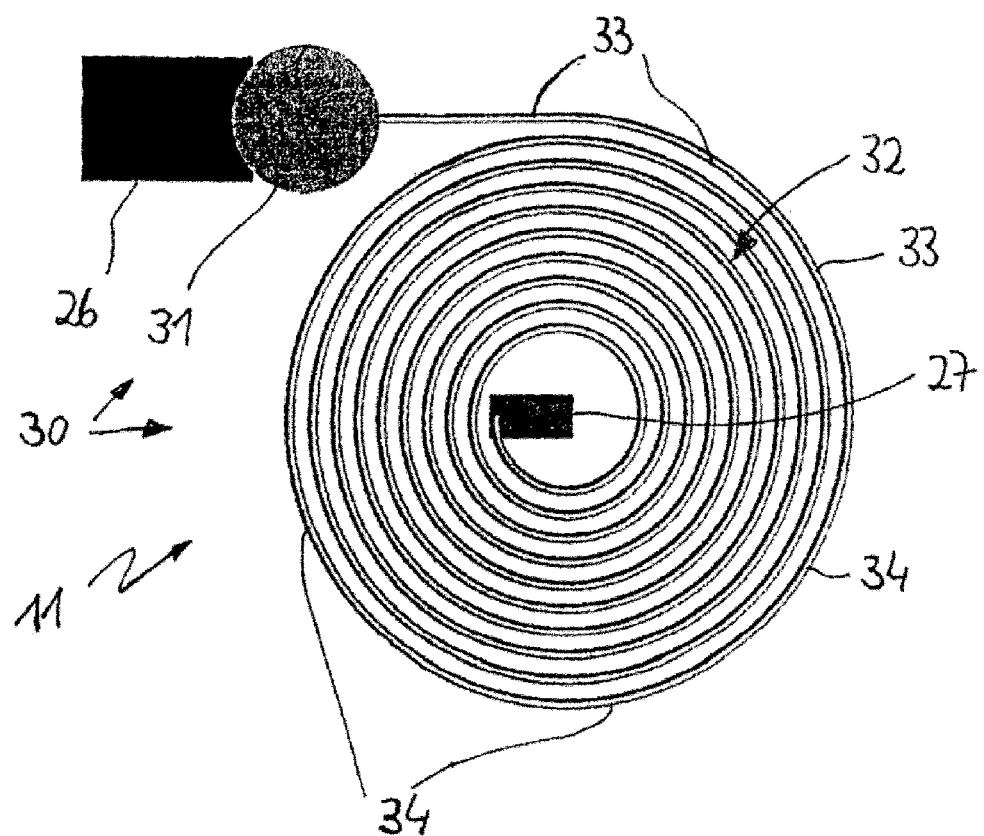
Figure 25:
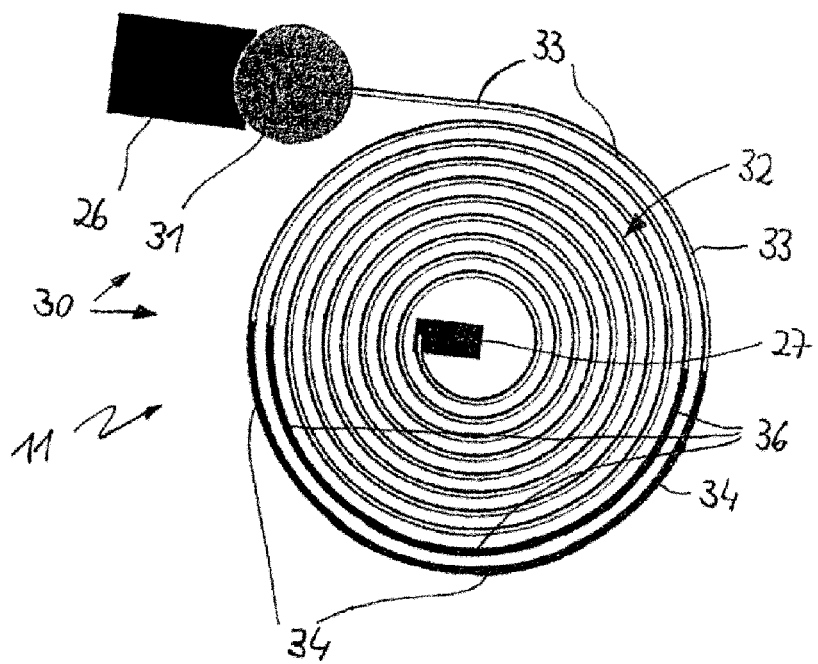
Figure 26:
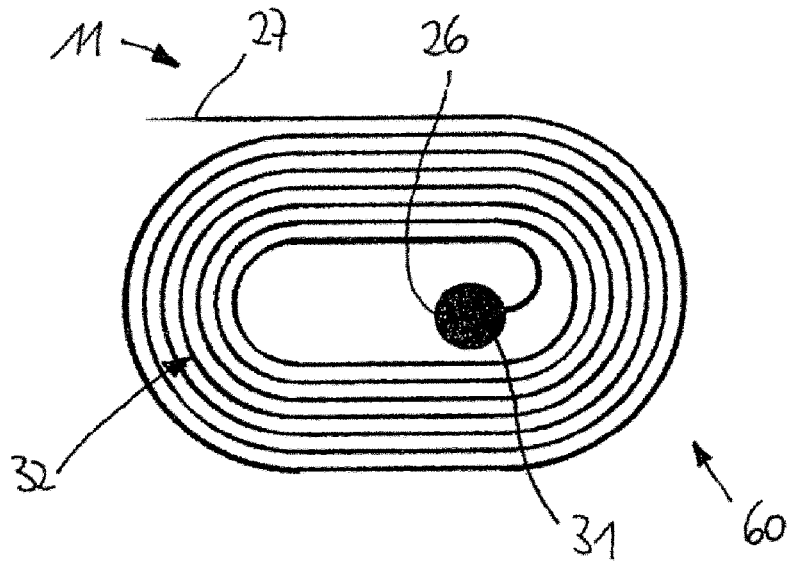
Figure 27:
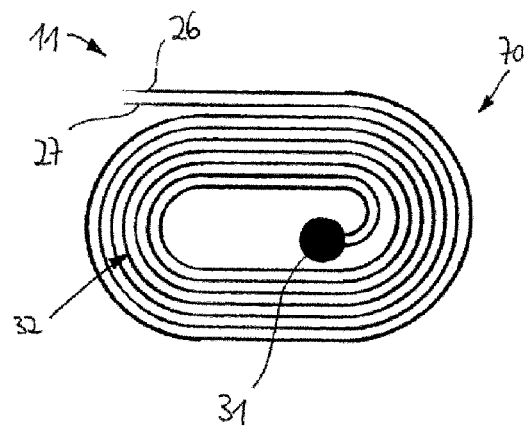
Figure 28:
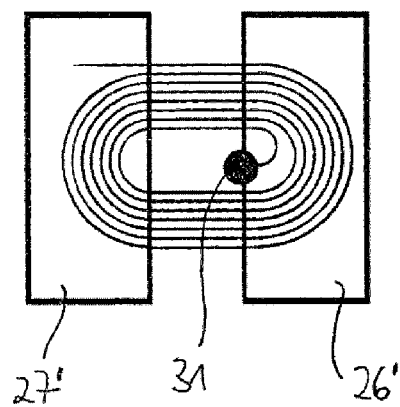

Aspects of these embodiments are described below with reference to FIGS. 21 to 30b. Here, FIG. 21 shows a schematic top view of an embodiment of a revolution counter of type 1 with a first embodiment of a sensor element, FIG. 22 shows a schematic cross-section through the sensor element of FIG. 21, FIG. 23 shows a schematic top view of the sensor element of FIG. 21, FIGS. 24a to 24e show schematic top views of the sensor element of FIG. 21 with schematically depicted magnetizations, FIG. 25 shows a schematic top view of the sensor element of FIG. 21 with schematically depicted changes, FIG. 26 shows a schematic top view of a second embodiment of the sensor element of FIG. 21, FIG. 27 shows a schematic top view of a third embodiment of the sensor element of FIG. 21, FIG. 28 shows a schematic top view of a fourth embodiment of the sensor element of FIG. 21, FIG. 29 shows a schematic top view of a fifth embodiment of the sensor element of FIG. 21, and FIGS. 30a and 30b show schematic top views of two Wheatstone bridges constructed with sensor elements corresponding to the revolution counter of type 1.

Figure 21:
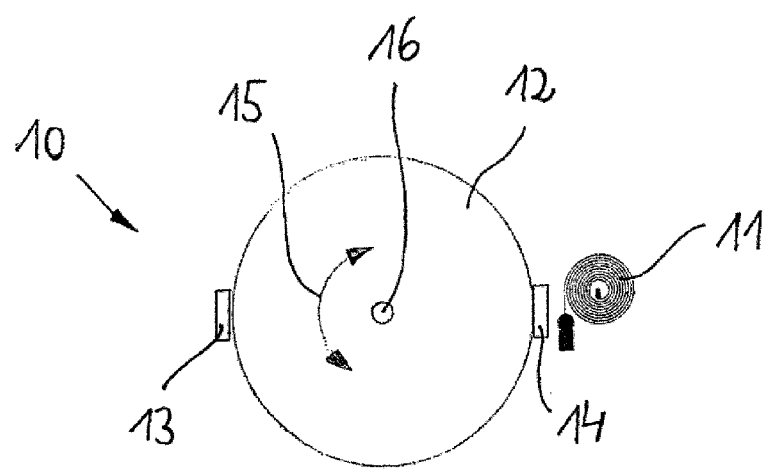

FIG. 21 shows a revolution counter 10 (type 1) in which a stationary sensor element 11 is assigned to a rotor 12 having two permanent magnets 13, 14. It is understood that there may also be a plurality of sensor elements arranged, for example, at equal distances from each other along the circumference of the rotor 12. Rotor 12 is rotatable about an axis 16 in both directions according to the arrow 15. The two permanent magnets 13, 14 rotate together with rotor 12. When rotor 12 rotates, the magnetic fields of permanent magnets 13, 14 are moved past sensor element 11 and are detected by the same. Permanent magnets 13, 14 can be moved past sensor element 11 above or below. It is essential that the magnetic fields of permanent magnets 13, 14 have a sufficiently large but not too strong influence on sensor element 11, in particular on its layers which are explained below with reference to FIG. 22.

The magnetization of the two permanent magnets 13, 14 is oriented in opposite directions to each other. This means that when rotor 12 rotates in the same direction, first permanent magnet 13, for example, is moved past sensor element 11 with a north-south orientation, the second permanent magnet 14 is moved past sensor element 11 with a south-north orientation.

From the point of view of sensor element 11, the passing of, for example, permanent magnet 13 has the following effects: First, sensor element 11 "sees" the magnetic field lines emerging approximately perpendicularly from the north pole of permanent magnet 13, then sensor element 11

"sees" the magnetic field lines of permanent magnet 13 extending approximately parallel from the north pole to the south pole, and finally sensor element 11 "sees" the magnetic field lines re-entering the south pole of permanent magnet 13 approximately perpendicularly. All in all, from the point of view of sensor element 11, this represents a rotation of the magnetic field lines of permanent magnet 13 by 180 degrees during the passing.

In FIG. 1, the two permanent magnets 13, 14 are mounted 180 degrees apart on the circumference of rotor 12. This distance can also be provided asymmetrically. For example, the two permanent magnets 13, 14 can also be mounted directly adjacent to each other on the circumference of rotor 12.

Revolution counter 10 of FIG. 21 is provided for contactless counting and storing of revolutions of rotor 10 by sensor element 11. This counting and storing does not require any external power supply. For example, the Giant Magneto Resistance (GMR) effect or the Tunnel Magneto Resistance (TMR) effect or the Colossal Magneto Resistance (CMS) effect can be used to read out the stored revolutions.

FIG. 22 shows a layered structure 20 of sensor element 11 that uses the GMR effect to read out the stored revolutions. A soft magnetic layer 21 is separated from a hard magnetic layer 23 by a thin non-magnetic layer 22. An antiferromagnetic layer 24 reinforces the hard magnetic properties of hard magnetic layer 23 in the sense of a so-called "pinning".

The latter has the consequence that the magnetization in hard magnetic layer 23, in contrast to the magnetization in soft magnetic layer 21, is not changed by a passing magnetic field of one of the two permanent magnets 13, 14. Soft magnetic layer 21 therefore represents a sensor layer and hard magnetic layer 23 represents a reference layer.

A contacting layer 25 is provided on layer 24 and is provided with a first contact 26. As will be explained alter, a second contact 27, not shown in FIG. 22, is provided at a different location on sensor element 11. Thus, a measuring current can flow through layer structure 20 between the two contacts 26, 27. As will also be explained later, the measurement current can be used to infer the number of stored revolutions.

Contacting layer 25 may be covered by an insulating layer 28. For the purpose of contacting, contacts 26, 27 are in this case at least partially exposed, i.e. not covered by insulating layer 28. The entire layer structure 20 may, for example, be deposited on a silicon substrate. The described layer structure 20 is often also denoted as a spin valve.

In connection with the Tunnel Magneto Resistance (TMR) effect, one of the two contacts 26, 27 must be located below non-magnetic layer 22, and the other of the two contacts 26, 27 must be located above non-magnetic layer 22.

In FIG. 23, a design 30 of sensor element 11 is shown, which comprises a wall generator 31 and a wall memory 32. Furthermore, the two contacts 26, 27 are shown in FIG. 3. Wall generator 31 is formed as a circular area and is connected to contact 26. Wall memory 32 is formed as a spiral, the outer beginning of which is connected to wall generator 31, and which, starting from its beginning, is composed of spiral arcs having decreasing radiuses. The outermost turn of the spiral in FIG. 3 is made up of spiral arcs 33, 34, for example. At the end of the spiral, and thus in the interior of (or inside) the same, the spiral is connected to contact 27. It is noted that wall memory 32 may be not only a spiral, but also another spiral-shaped structure.

For example, the wall memory 32 may thus be a spiral-like structure composed of straight line sections, in which the length of the straight line sections decreases the farther the straight line sections are arranged in the interior of the structure. Likewise, a square or polygonal spiral-shaped structure composed of square-like or rectangular sections may be provided as wall storage 32 for example, in which the size of the square-like or rectangular sections decreases the farther the sections are arranged in the interior of the structure. It is additionally possible that the corners of these spiral-like structures are rounded.

In the following, the present embodiment is explained on the basis of the spiral shown in FIG. 23 as wall memory 32. However, these explanations also apply accordingly to any other spiral-shaped structure.

The spiral shown in FIG. 23 is formed by a strip which, for example, has a width of about 2 micrometers and winds from the outside to the inside with a spacing of about 2 micrometers. By way of example, the spiral has ten turns.

At the end of the spiral, the aforementioned strip tapers and becomes pointed. The width of the strip there becomes smaller than about 2 micrometers. This pointed end portion of the spiral can either extend only slightly into the region of contact 27 or can be located substantially completely below contact 27.

Due to the pointed end portion of the spiral, it is achieved that no domain wall can be generated or stored in this end portion. The arrangement of the pointed end portion under contact 27 ensures that the electrical connection between the spiral and contact 27 does not deteriorate.

Due to the circular shape of wall generator 31, the magnetization direction of the sensor layer of wall generator 31 can easily follow a passing magnetic field. However, as mentioned above, the magnetization direction of the reference layer does not change due to a passing magnetic field.

In FIGS. 24a to 24e, sensor element 11 is shown again in the same manner as explained with reference to FIG. 23. However, in addition, in FIGS. 24a to 24e arrows are drawn along the course of the spiral of wall memory 32. These arrows indicate the direction of magnetization of the spiral, and in fact the individual arrows always refer to that region of the spiral at which they are respectively drawn.

Figure 24A:
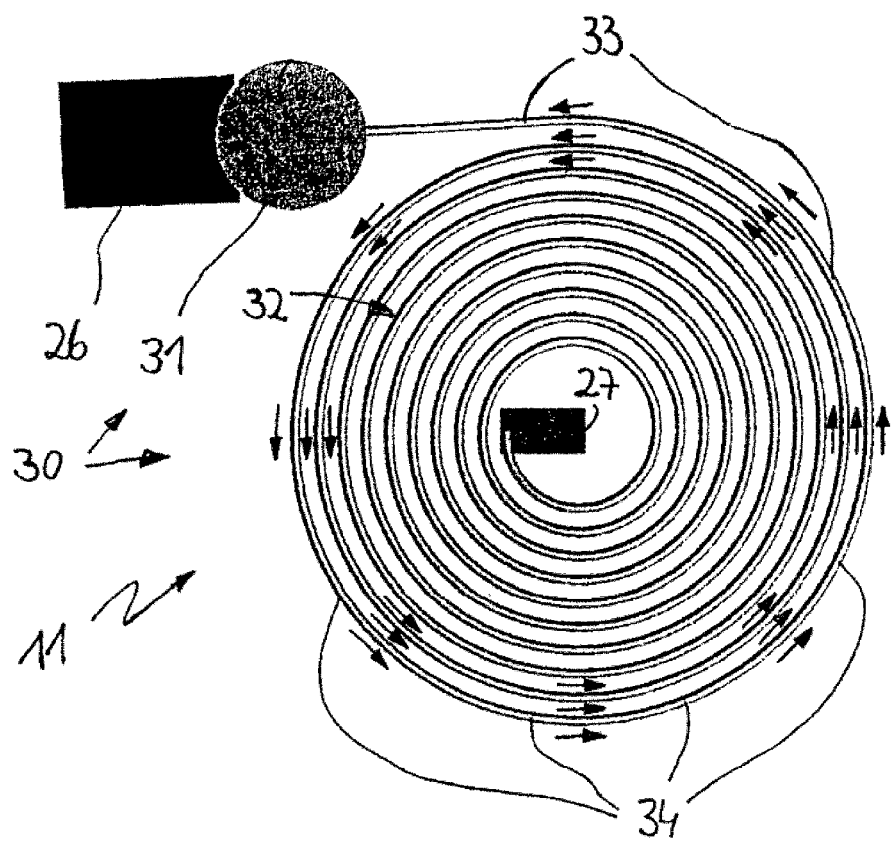

In FIG. 24a, all magnetization directions drawn in the region of wall storage 32 have the same direction, namely all arrows point counterclockwise from the end of the spiral, i.e. from contact 27, towards the beginning of the spiral, i.e. towards wall generator 31. It is understood that all arrows could also be oriented clockwise and thus the magnetization directions represented by the arrows could be opposite.

For the purpose of explaining the functional principle of sensor element 11, it is assumed that the orientation of the magnetization direction of the spiral shown in FIG. 24a is present at a first instant of time in soft magnetic layer 21, i.e. in the sensor layer, and also in hard magnetic layer 23, i.e. in the reference layer of wall memory 32. This can be achieved by a corresponding formation of wall memory 32, i.e. a pre-magnetization of the sensor layer and the reference layer of the spiral.

The orientation of the reference layer is always approximately parallel to the course of the strip of the spiral and is always oriented in the same direction of the spiral. The direction in which the magnetization of the spiral is oriented, i.e. whether this is clockwise or counterclockwise, is not essential. It is only essential that it is always the same direction along the entire spiral. This orientation of the magnetization remains unchanged in the hard magnetic reference layer.

For example, permanent magnet 13 is now moved past sensor element 11 due to a rotation of rotor 12. As has been explained, this has the effect that sensor element 11 "sees" a rotation of the magnetic field of permanent magnet 13 by 180 degrees. As was also explained, the magnetization direction of the sensor layer of wall generator 31 follows the passing magnetic field of permanent magnet 13, but the magnetization direction of the reference layer does not change.

FIG. 4b shows the orientation of the magnetization direction of the spiral in soft magnetic layer 21, i.e. in the sensor layer of wall memory 32, at a second instant of time when permanent magnet 13 has already passed sensor element 11. For clarification, the direction of magnetization "seen" by sensor element 11 at the end of the movement past permanent magnet 13 is drawn as arrow 35 in FIG. 4b.

As has been explained, the magnetization direction of wall generator 31 follows the magnetic field of permanent magnet 13, so that arrow 35 of FIG. 4b also represents the magnetization direction of wall generator 31.

A comparison of the direction of arrow 35 representing the direction of magnetization of wall generator 31 of FIG. 4b and the direction of magnetization of the beginning of the spiral before the passing of permanent magnet 13 according to FIG. 24a shows that these directions of magnetization are opposite to each other. As a result, a domain wall is formed approximately in the region of the junction of wall generator 31 and the beginning of the spiral (not shown). Due to the unique change of the magnetization direction, this is a 180-degree wall. This 180-degree wall migrates from its point of origin at the beginning of the spiral along the same to a location 41 of the spiral. There, the aforementioned 180-degree wall is marked as a dark rectangle with the reference sign 42. At this location 41, the 180-degree wall 42 has an energetically more favorable state than at its point of origin, since only there the neighboring spiral arcs 33, 34 do not have any antiparallel components with respect to the direction of magnetization indicated by the arrow 35.

Figure 24B:
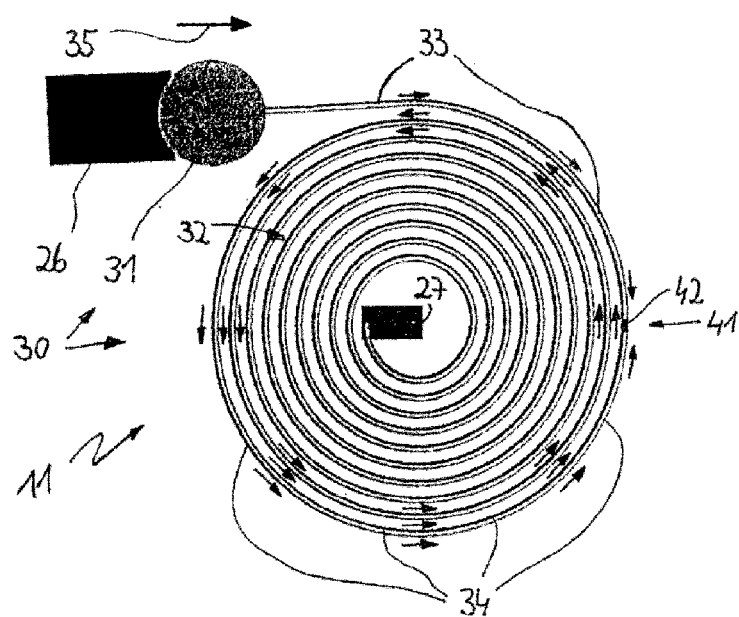

A comparison of FIG. 24b with FIG. 24a shows that the magnetization direction of the spiral in the sensor layer of wall memory 32 has changed in the area of first spiral arc 33, but not in the area of second spiral arc 34 and the subsequent spiral arcs.

At location 41 existing approximately between first spiral arc 33 and second spiral arc 34, the mutually opposite magnetization directions of the two spiral arcs 33, 34 meet. This can be derived from FIG. 24b in that the arrows shown point in opposite directions. The 180-degree wall 42 is located approximately at this location 41 of the spiral.

Rotor 12 is now rotated further in the same direction so that permanent magnet 14 is moved past sensor element 11. This in turn results in the magnetization direction of the sensor layer of wall generator 31 following the magnetic field of permanent magnet 14 as it moves past. However, the magnetization direction of the reference layer does not change.

Figure 24C:
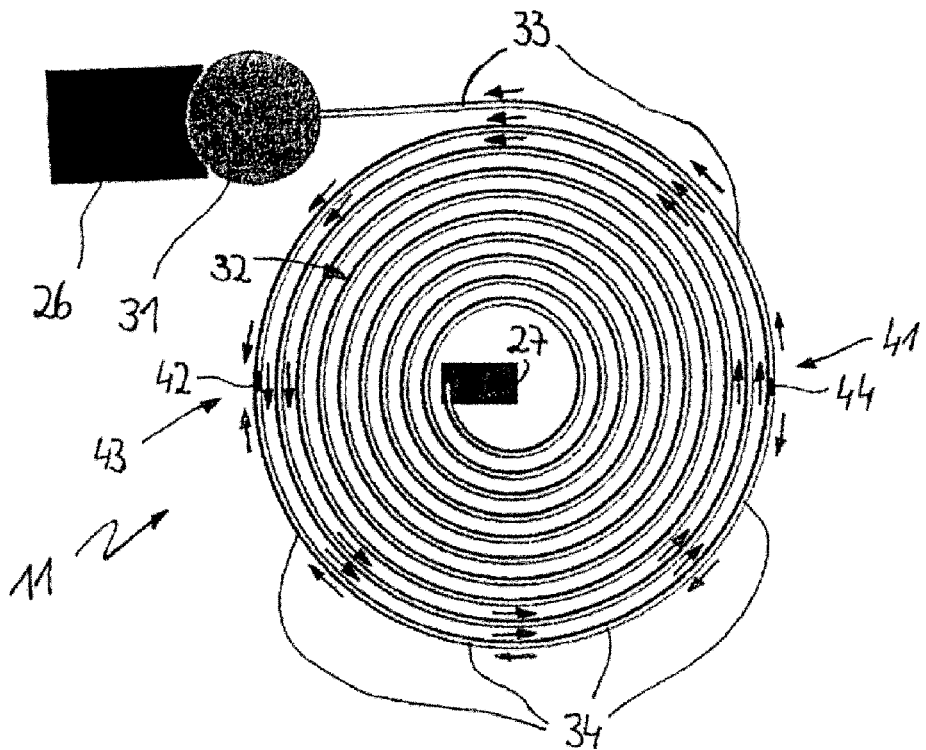

FIG. 24c shows the orientation of the magnetization direction of the spiral in soft magnetic layer 21, i.e. in the sensor layer of wall memory 32, at a third instant of time when permanent magnet 14 has already passed sensor element 11. A comparison of FIG. 24c with FIG. 24b shows that the magnetization direction of the spiral in the sensor layer of wall memory 32 has changed in the region of first spiral arc 33 and second spiral arc 34, but not in the spiral arcs following thereafter. The change in first spiral arc 33 is a result of a renewed change in the magnetization direction of wall generator 31 due to the passing of permanent magnet 14. The change in second spiral arc 34 is a result of the 180-degree wall 42 having again moved on due to the aforementioned renewed change in the magnetization direction of first spiral arc 33 and the resulting change in the energetic state of the 180-degree wall 42.

The 180-degree wall 42, which was present at location 41 at the second instant of time of FIG. 24b, is thus located at a location 43 at the third instant of time of FIG. 24c, which is located approximately 180 degrees downstream of location 41 in the course of the spiral of wall storage 32. At location 41 of FIG. 24c, again, the opposite directions of magnetization of the two spiral arcs 33, 34 meet. Thus, at about this location 41 of the spiral, there is another 180-degree wall 44, which is indicated as a dark rectangle in FIG. 24c. This 180-degree wall is created, in the manner already explained, in the region of the beginning of the spiral and then moves to location 41.

Rotor 12 is now rotated further in the same direction, so that permanent magnet 13 is now moved past sensor element 11. As a result, the magnetization direction of the sensor layer of wall generator 31 follows the magnetic field of permanent magnet 13 as it moves past.

Figure 24D:
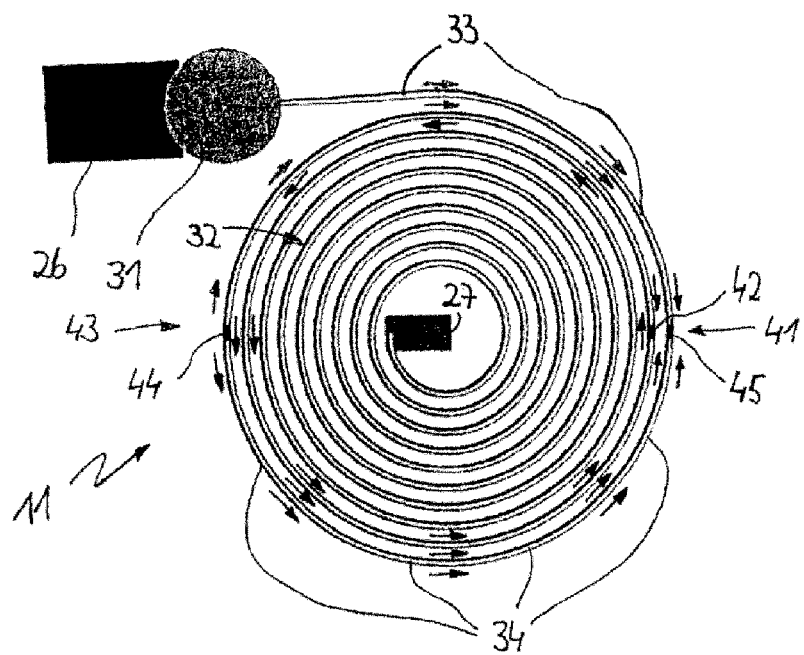

FIG. 24d shows the orientation of the magnetization direction of the spiral in soft magnetic layer 21, i.e., in the sensor layer of wall memory 32, at a fourth instant of time when permanent magnet 13 has already passed sensor element 11.

In FIG. 24d, the 180-degree wall 42 has again moved on to location 41 of the spiral. There, however, the 180-degree wall 42 is in the second turn of the spiral and not in the first outer turn as in FIG. 24b. Furthermore, the 180-degree wall 44 has moved on in the outer turn of the spiral from location 41 to location 43. And finally, another 180-degree wall 45 has been created at location 41 in the first outer turn of the spiral.

Rotor 12 is now rotated further in the same direction so that permanent magnet 14 is again moved past sensor element 11. As a result, the magnetization direction of the sensor layer of wall generator 31 follows the magnetic field of permanent magnet 14 as it moves past.

Figure 24E:
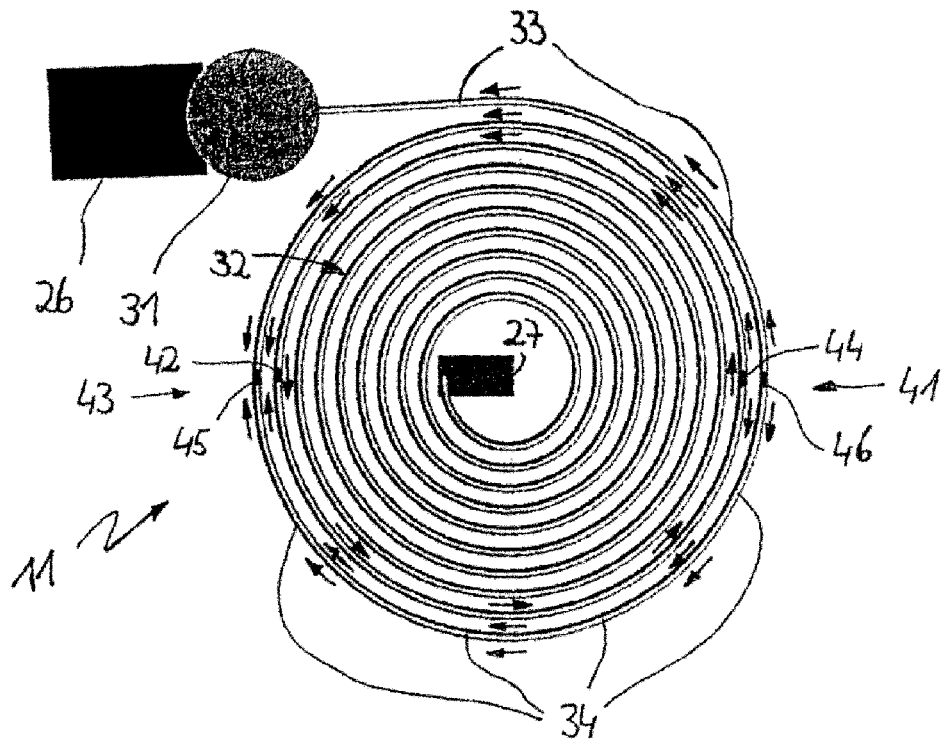

In FIG. 24e, the orientation of the magnetization direction of the spiral in soft magnetic layer 21, i.e., in the sensor layer of wall memory 32, is shown at a fifth instant of time when permanent magnet 14 has already moved past sensor element 11. In FIG. 24e, the 180-degree wall 42 has again moved on to location 43 of the second turn of the spiral. Furthermore, the 180-degree wall 44 has moved on to location 41 of the second turn of the spiral. Accordingly, the 180-degree wall 45 has moved on to location 43 of the outer turn. And finally, another 180-degree wall 46 has been created at location 41 in the first, outer turn of the spiral.

From the first instant of time in FIG. 24a to the fifth instant of time in FIG. 24e, each of the two permanent magnets 13, 14 has been moved past sensor element 11 two times. Rotor 12 has thus rotated through two revolutions. As has been explained, during these two revolutions of rotor 12, a total of four domain walls have been created in the spiral of wall memory 32, namely the four 180-degree walls 42, 44, 45, 46. It is understood that further rotation of rotor 12 in the same direction would create further domain walls in a corresponding manner.

As has also been explained and as can be derived in particular from FIG. 24e, the magnetization directions in the sensor layer of the spiral are always opposite to each other between the individual 180 degree walls. This means that in the two outer turns of the spiral, the magnetization directions are always reversed after each 180-degree wall 42, 44, 45, 46.

In FIG. 25, sensor element 11 is shown again in the same way as explained with reference to FIG. 23 and FIGS. 24a to 24e. In FIG. 25, however, the different magnetizations of the spiral of wall memory 32 are not shown with arrows as in FIGS. 24a to 24e, rather those spiral arcs are marked dark whose magnetization in FIG. 24e differs from the magnetization of FIG. 24a. A comparison of the two figures mentioned shows that these are spiral arc 34 of the outer first turn of the spiral, as well as a spiral arc 36 which extends adjacent to spiral arc 34 in the next inner second turn of the spiral.

The changed magnetization direction of spiral arcs 34, 36 of FIG. 25 refers, as has been explained, only to the sensor layer of wall memory 32. In the reference layer of the respective spiral arcs 34, 36, however, no change of the magnetization direction occurs. As a result, the magnetization of the sensor layer in the area of the spiral arcs 34, 36 is oriented antiparallel to the magnetization of the reference layer. This is equivalent to the fact that the two spiral arcs 34, 36 form an electrical resistance that is high compared to the other spiral arcs in which the magnetization of the sensor layer and of the reference layer are oriented parallel to each other.

The electrical resistance of the entire spiral can be determined by means of the measuring current flowing via contacts 26, 27 already mentioned above. If there is a spiral arc within the spiral in which the sensor layer and the reference layer are magnetized antiparallel, this results in an increased resistance. If several such spiral arcs are present, this leads to a respective multiply increased resistance.

In order for a spiral arc in an outer turn of the spiral to cause approximately the same change in resistance as a spiral arc in an inner turn, the width of the strip forming the spiral may change over the entire course. For example, the width of the strip can decrease from the outside to the inside in connection with the Giant Magneto Resistance (GMR) effect.

As explained, the two antiparallel magnetized spiral arcs 34, 36 shown in FIG. 25 are the result of two revolutions of rotor 12. Thus, in the described embodiment, one antiparallel magnetized spiral arc of wall memory 32 corresponds to exactly one revolution of rotor 12.

Overall, the electrical resistance of the spiral can thus be inferred using contacts 26, 27 of sensor element 11. From this, the number of existing, antiparallel magnetized spiral arcs and thus the number of revolutions of rotor 12 can be inferred.

When rotor 12 is rotated in its opposite direction, this causes a change in the energetic state of the 180-degree walls present in wall memory 32. As a result, these existing 180-degree walls move along the spiral in the direction of the most favorable energetic state, as has already been explained. Due to the rotation of rotor 12 in the opposite direction, the existing 180-degree walls also move in the opposite direction.

Furthermore, 180-degree walls are again created in wall generator 31 in accordance with the functional principle already described, but these are oriented in the opposite direction to the 180-degree walls explained above. As a result the 180-degree walls, that are now created one after the other, successively erase the existing 180-degree walls that are migrating in the opposite direction. The antiparallel magnetized spiral arcs shown in FIG. 25 thus disappear from the inside to the outside until the state of FIG. 24a is reached again.

During this backward rotation of rotor 12, the number of existing antiparallel magnetized spiral arcs can be determined via contacts 26, 27 in the manner already explained.

If rotor 12 continues to be rotated in the opposite direction even after all the 180-degree walls present in wall memory 32 have been erased, new 180-degree walls are created which move into wall memory 32 in the manner described. The direction of rotation of these new 180-degree walls is opposite to the direction of rotation of the erased 180-degree walls.

If rotor 12 continues to be rotated until all turns of the spiral of wall memory 32 are occupied by 180-degree walls, no further 180-degree walls are created when rotor 12 continues to be rotated. The number of existing 180-degree walls then remains constant.

The explained functional principle of sensor element 11 is independent of a power supply with regard to the creation of domain walls and the resulting antiparallel magnetized spiral arcs. This means that a rotation of rotor 12 always leads to a change in the magnetization directions, even if there is no electrical connection at contacts 26, 27. The number of revolutions performed by rotor 12 is therefore counted and stored in the spiral of wall memory 32 without any power supply.

Only for reading out wall memory 32, i.e. for reading out the number of revolutions performed by rotor 12, is it necessary to cause a measuring current to flow via contacts 26, 27. As mentioned, however, this measuring current is not required for counting the revolutions.

In sensor element 11 described, wall generator 31 is arranged at the beginning of the spiral which forms wall memory 32, while only contact 27 is present at the end of the spiral. Alternatively, it is possible to provide the wall generator not at the beginning, but only at the end of the spiral.

It is also possible to provide one wall generator respectively at the beginning and at the end of the spiral.

In particular, the described revolution counter 10 (FIG. 21) can be used as a first magnetic sensor 131 (FIG. 2) for apparatus 100, 100a, 100b, 100c, 100d according to the embodiments. For example, revolution counter 10 (FIG. 21) can detect a radial magnetic field rotating relative to sensor device 130 (FIG. 2), as can be generated by magnet arrangement 120 (FIG. 2), and count the corresponding revolutions, from which information about a position of sensor device 130 along the z-coordinate of support 110 can be determined. Thus, if first magnetic sensor 131 formed as a revolution counter 10 is moved along the z-coordinate of support 110, this is detected by revolution counter 10 in the form of counted (relative) revolutions of the magnetic field whose radial component(s) vary along the z-coordinate of support 110. This recorded number of revolutions is thereby retained in revolution counter 10 even if apparatus 100 is deactivated, or if a defect occurs in the power supply to the apparatus.

FIG. 26 shows a design 60 of sensor element 11 which differs from design 30 of sensor element 11 of FIG. 23. Sensor element 11 of FIG. 26 has several straight line sections parallel to each other, which are connected to each other by semicircular sections and form a spiral and thus the wall memory 32.

In sensor element 11 of FIG. 26, wall generator 31 is arranged in the interior of the spiral. Furthermore, the two contacts 26, 27 are indicated in FIG. 26. The magnetization of hard magnetic layer 23, i.e. the reference layer, is preferably oriented approximately parallel to the straight line segments in sensor element 11 of FIG. 26.

Furthermore, the explanations for FIGS. 21 to 25 apply accordingly to sensor element 11 of FIG. 26.

FIG. 27 shows a design 70 of sensor element 11 which differs from design 30 of sensor element 11 of FIG. 23. The design 70 of FIG. 27 is similar to design 60 of FIG. 26, but in contrast to FIG. 26, design 70 of FIG. 27 is a double spiral.

One of the two spirals of sensor element 11 of FIG. 27 corresponds to the spiral of sensor element 11 of FIG. 26, and thus, to wall memory 32. The other spiral of the sensor element of FIG. 27, on the other hand, is provided for leading out the internal electrical contact. Thus, both contacts 26, 27 of sensor element 11 of FIG. 27 are accessible from the outside.

Furthermore, the explanations for FIGS. 21 to 26 apply accordingly to sensor element 11 of FIG. 27.

In the FIG. 28, the electrical contacts of sensor element 11 are formed differently than in the FIG. 26, for example. While in sensor element 11 of FIG. 26 the contacts 26, 27 are arranged at the beginning and at the end of the spiral, this is not the case in sensor element 11 of FIG. 28. Instead, contacts 26', 27' each extend over the region of the semicircular sections of the spiral in such a way that only the region of the straight line sections is not covered by contacts 26', 27'. As a result, the semicircular sections in the region of the two contacts 26', 27' are each electrically short-circuited.

Whereas in sensor element 11 of FIG. 26 the successive semicircular sections and straight line sections of the spiral thus electrically form a series circuit, this is not the case in sensor element 11 of FIG. 28 due to the short-circuiting effect of contacts 26', 27'. Instead, the straight line sections of the spiral electrically form here a parallel circuit to which the semicircular sections do not contribute.

As in the case of sensor element 11 of FIG. 26, also in the case of sensor element 11 of FIG. 28 the electrical resistance of the spiral can be read out in the described manner via contacts 26', 27'. However, the electrical resistance of sensor element 11 of FIG. 28 is lower than that of the sensor element of FIG. 26.

Furthermore, the explanations for FIGS. 21 to 26 apply accordingly to sensor element 11 of FIG. 28.

In FIG. 29, the electrical contacts of sensor element 11 are designed differently than, for example, in FIG. 26. While in sensor element 11 of FIG. 26 the contacts 26, 27 are arranged at the beginning and at the end of the spiral, this is not the case in sensor element 11 of FIG. 29. Instead, contacts 26", 27" are present at the beginning and at the end of each straight line section.

The number of paired contacts 26", 27" thus corresponds to the number of straight line sections.

Preferably, contacts 26", 27" are spaced apart from each other such that all straight line sections have approximately the same length. With this arrangement of contacts 26", 27" it is possible to read out the electrical resistance of each individual straight line section separately. The total electrical resistance of the spiral can then be derived from these partial resistances. Furthermore, the explanations for FIGS. 21 to 26 apply accordingly to sensor element 11 of FIG. 29.

In each of the FIGS. 30a and 30b, four sensor elements 11 are assembled to form a Wheatstone bridge 1100. Sensor elements 11 may be any of the embodiments as explained with reference to FIGS. 23 to 29.

In the Wheatstone bridges 1100 of FIGS. 30a and 30b, the spirals of each of two sensor elements 11 have a winding sense that is oriented opposite to the spirals of each of the other two sensor elements 11. In FIGS. 30a and 30b, the spirals that are wound in the clockwise direction are denoted by reference sign 1101, while the spirals that are wound in the counterclockwise direction are denoted by reference sign 1102.

In the Wheatstone bridge 1100 of FIG. 30a, contacts 1103, 1104, 1105, 1106 are provided to short-circuit the semicircular sections of each of the respective sensor elements 11 in a manner similar to sensor element 11 of FIG. 28. Furthermore, these contacts 1103, 1104, 1105, 1106 are connected to each other that the straight line sections of the four sensor elements 11 altogether form an electrical parallel circuit.

In the Wheatstone bridge 1100 of FIG. 30b, contacts 1107, 1108, 1109, 1110 are provided to interconnect the beginning and the end of the spirals of respective sensor elements 11. The contacts 1107, 1108, 1109, 1110 are arranged and electrically insulated from the individual spirals such that the spirals of sensor elements 11 altogether form an electrical series circuit. With regard to sensor elements 11 present in FIGS. 30a and 30b, the explanations for FIGS. 21 to 29 apply accordingly.

Further details of the revolution counter type 1, which can be combined with one or more of the embodiments described herein, are also described in EP 1 740 909 B1.

In other preferred embodiments, first magnetic sensor 131 (FIG. 3), which is configured as magnetic revolution counter according to particularly preferred embodiments, has the following configuration, hereinafter also referred to as "revolution counter type 2": a loop-like arrangement provided with N turns, comprising a GMR layer stack, into which magnetic 180° domains can be introduced, stored and read out by measuring the electrical resistance, wherein elongated loop sections are provided at a predeterminable angle with respect to to the reference direction impressed in the sensor that are provided, preferably centrally, with contacts to which an electrical potential can be applied and which serve serially or in parallel for reading electrical resistance ratios of individual loop sections to further individual contacts provided in curvature regions of the loop-like arrangement, wherein in particular the determined resistance ratios provide a direct measure of the presence or absence of a magnetic domain in the corresponding loop section and thus an unambiguous statement about the number of revolutions occurred.

Figure 10:
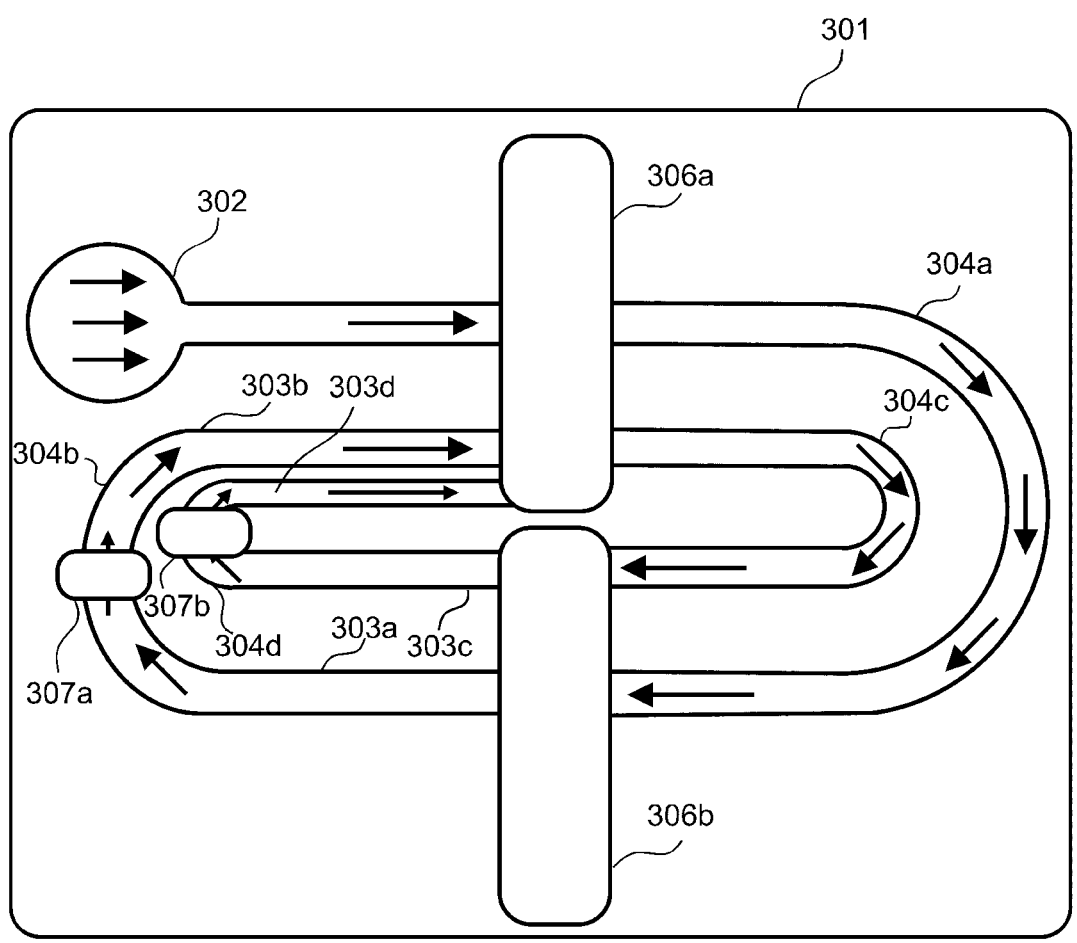
Figure 13:
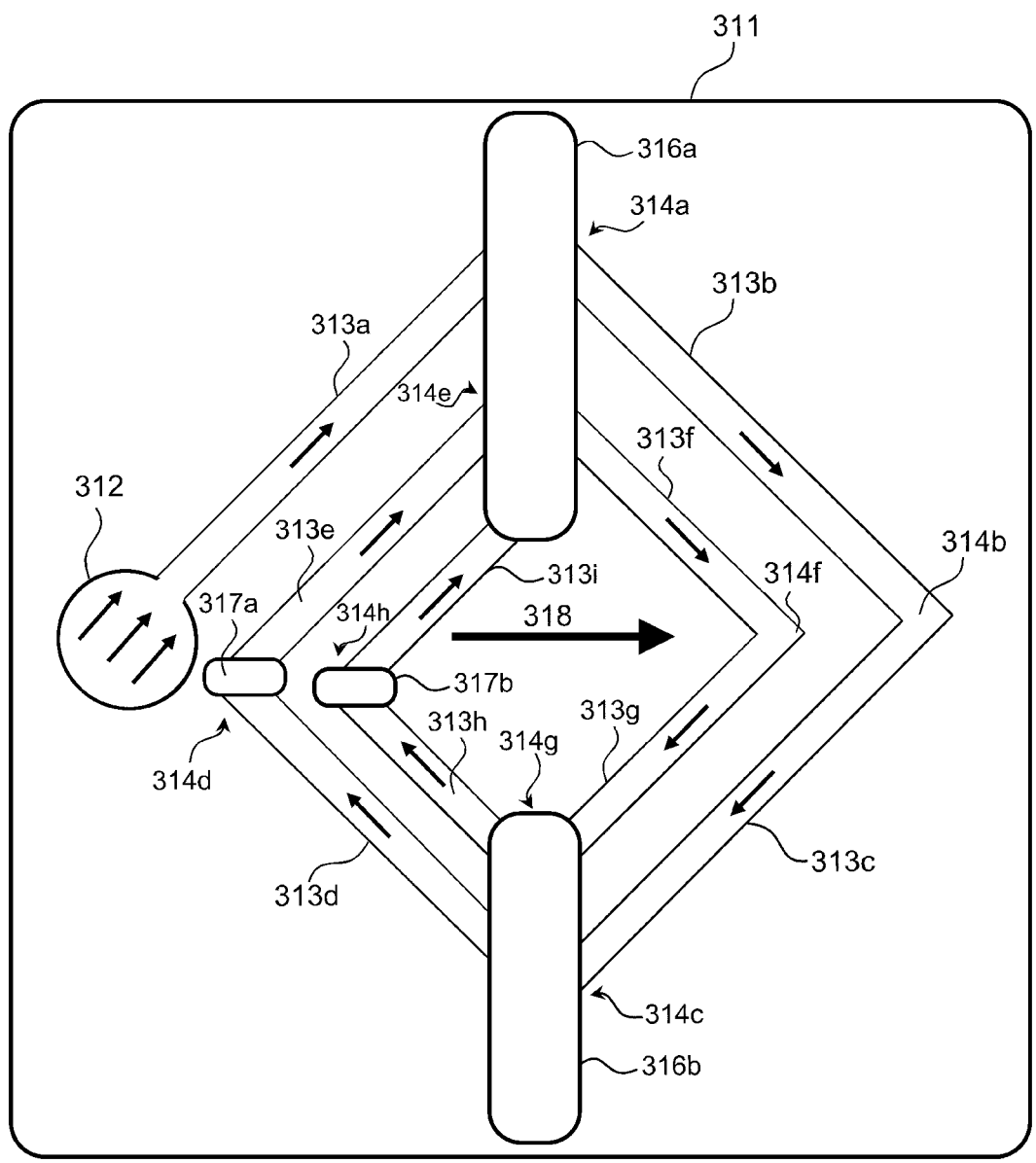
Figure 16:
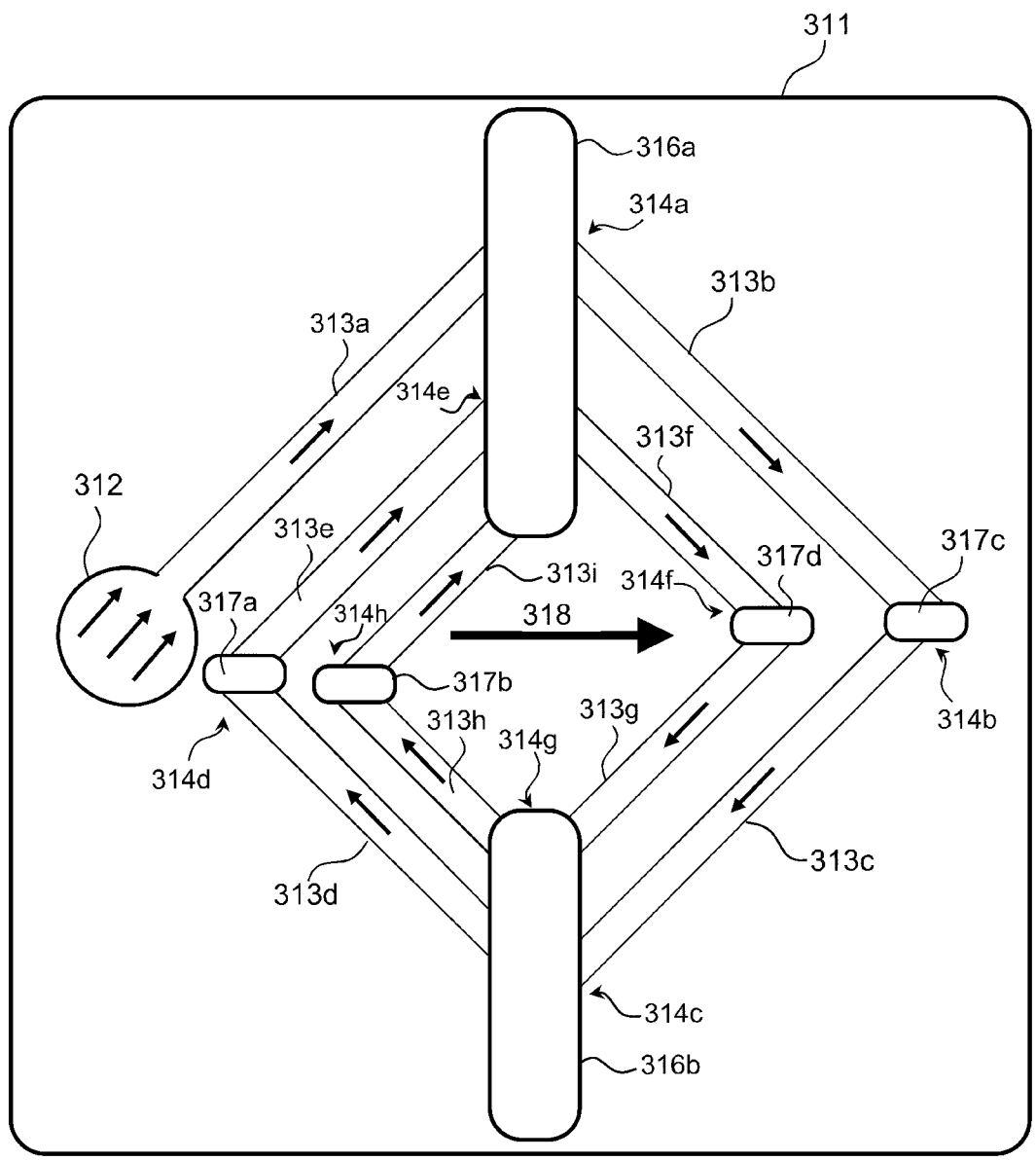
Figure 17:
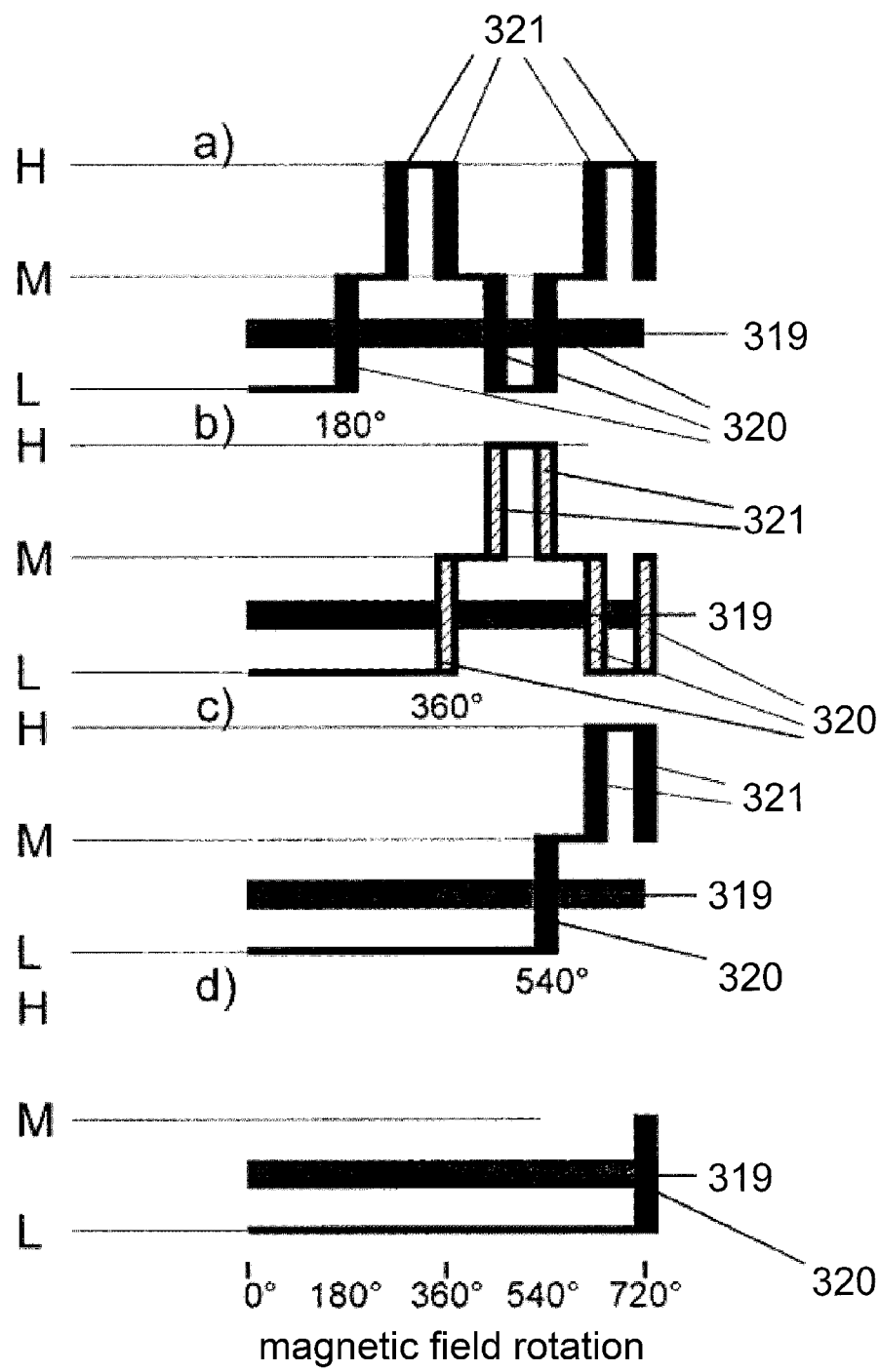
Figure 18:
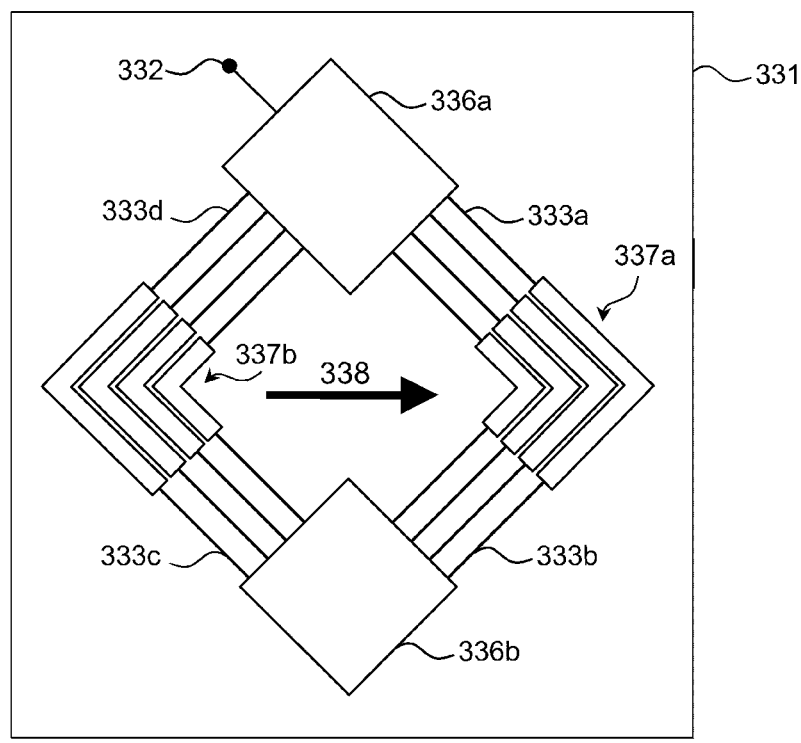
Figure 19:
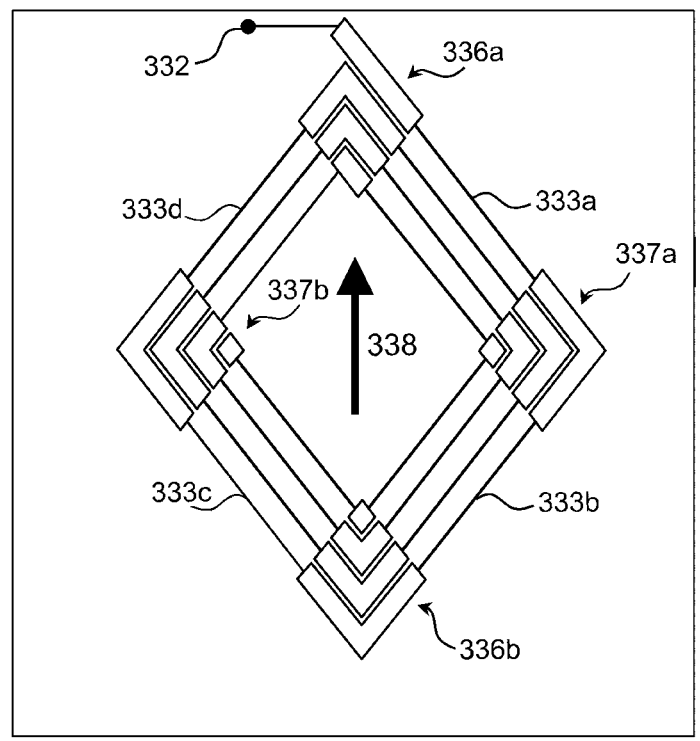
Figure 20:
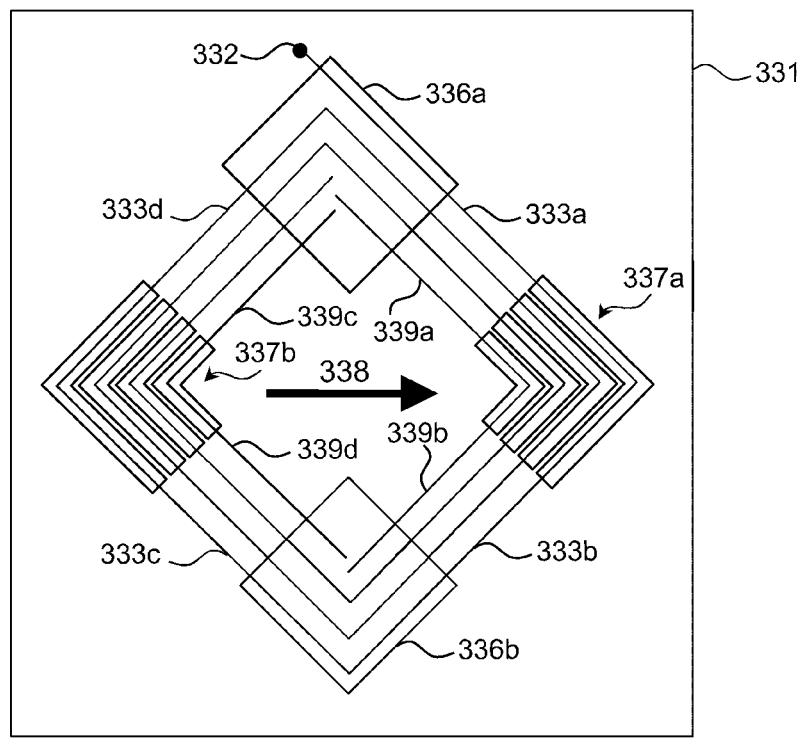

Aspects of these embodiments ("revolution counter type 2") are described below with reference to FIGS. 10 to 20. Here, FIG. 10 shows aspects of a first embodiment of the revolution counter type 2, FIG. 11 shows a partial cutout according to FIG. 10 with different magnetization states in the presence or absence of a domain wall; FIG. 12 shows potential curves and hysteresis regions according to the first embodiment when the external magnetic field is rotated; FIG. 13 shows a second embodiment of the revolution counter type 2; FIG. 14 shows four different possible magnetization arrangements in a partial cutout according to FIG. 13; FIG. 15 shows potential curves and hysteresis regions according to the second embodiment when the external magnetic field is rotated; FIG. 16 shows an advantageous circuit variant of the second embodiment of the revolution counter type 2; FIG. 17 shows exemplary sensor signals when reading out both sides of a variant according to FIG. 16; FIG. 18 shows a first special contact design for a sensor according to FIG. 16; FIG. 19 shows a further design of a variant according to FIG. 16 and FIG. 18 in rhombus shape with further differentiated contact designs; and FIG. 20 shows separate strip sections for forming reference signals.

FIG. 10 shows a first fundamental embodiment of the revolution counter type 2 with a domain wall generator 302 that generates magnetic domain walls. Details of the function of domain wall generator 302 are also described in DE 10 2008 063 226 A1, cf. there, for example, FIG. 3 and paragraphs [0005], [0006], which are herewith incorporated by reference. Sensor 301 according to FIG. 10, in preferred embodiments, is provided with two electrical contacts 306a and 306b, which in this example respectively contact the strips 303b and 303d and 303a and 303c jointly at the top or bottom. In preferred embodiments, these contacts 306a, 306b are each located in the center of the illustrated elongated strips. An electrical potential is applied to sensor 301 via these two contacts 306a, 306b. In curvatures (bends) 304b, 304d of the spiral, further individual electrical contacts 307a, 307b are provided in the example on the left, each contacting one turn. The preferred readout principle of this magnetic sensor wired in this way provides that a potential is applied to all turns via the common contacts 306a, 306b and that the potential drop for each turn is read out sequentially. This is preferably done by means of a multiplexer circuit, which in itself is customary and therefore does not need to be described further here and which sequentially establishes the connection from a common contact 306a or 306b to the individual contacts 307a, 307b in the curvatures.

Figure 11A:
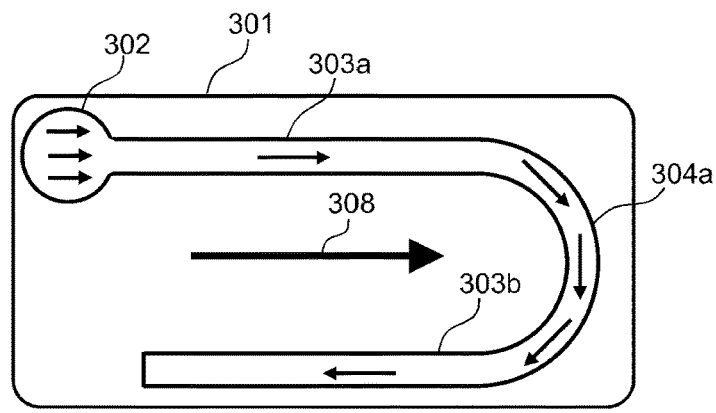
Figure 11B:
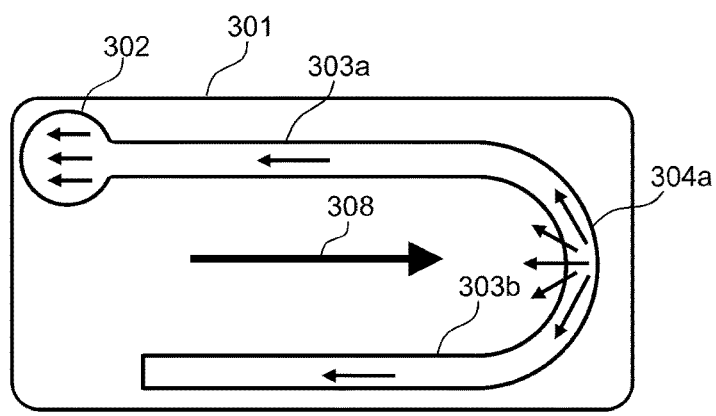
Figure 11C:
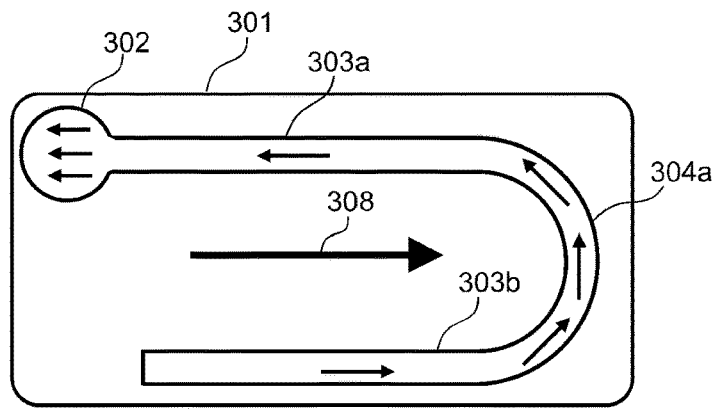
Figure 11D:
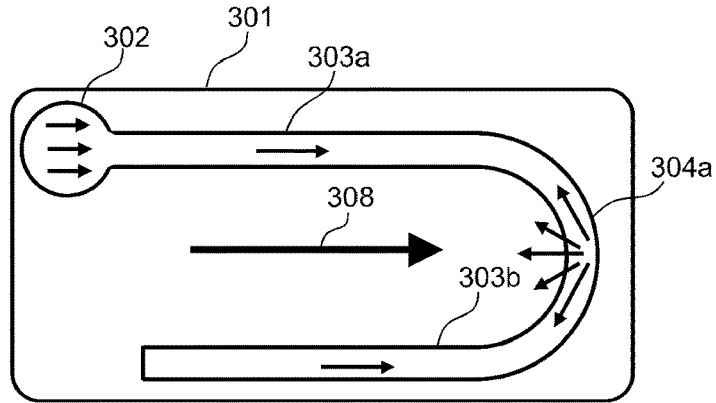

The voltage drop is thus measured in the substantially elongated strip sections (303b or 303d, or 303a or 303c) (turn segments). In the context of preferred embodiments, the contacts 307a and 307b are preferably configured to be large enough in area so that the specific location of a domain wall within the curved strip region is meaningless. In principle, exactly four magnetic states exist in each turn between contacts 306a and 306b in the intervening strip sections 303a and 303b, or 303c and 303d, as shown schematically for the first turn in FIG. 11: 1. no magnetic domain wall exists in curvature 304a, wherein the two elongated strip sections 303a, 303b are magnetized in the clockwise direction (strip section 303a to the right and strip section 303b to the left, FIG. 11a); 2. a magnetic domain wall exists in curvature 304a, so that the elongated strip sections 303a and 303b are magnetized to the left (FIG. 11b); 3. no magnetic domain wall exists in curvature 304a, wherein the two elongated strip sections 303a and 303b are magnetized in the counterclockwise direction (FIG. 11c); 4. a magnetic domain wall exists in curvature 304a, so that the elongated strip sections 303a and 303b are magnetized to the right (FIG. 11d).

Thus, if the reference direction 308 in sensor 301 points to the right, as in FIG. 11, and the potential drop across strip section 303a is measured, the following potential drops result for magnetization states 1-4: 1. <50% (hereafter L (=low)), since strip section 303a has a lower resistance than strip section 303b; 2. 50% (hereafter also denoted as M (=median), since the resistances of strip sections 303a and 303b are equal; 3. >50%, (hereafter H (=high)), since strip section 303a has a greater resistance than strip section 303b; 4. 50%, since the resistances of strip sections 303a and 303b are equal.

The deviation from the potential value 50% for magnetization states 1 and 3 depends on the magnitude of the GMR effect and the cosine of the angle between reference direction 308 and strip section 303a. The initial state of sensor 301 is free of magnetic domain walls. That is, each turn is in the first magnetic state, so that the potential drop is <50%. (When the reference direction faces to the other direction, the potential drop is >50%).

The preferred readout method of the sensor 301 provides that, controlled via a multiplexer, an electrical connection from contact 306a to contacts 307a and 307b is closed in sequence and the potential drop is measured in each case. When the potential drop of the first turn is <50% of the voltage between contacts 306a and 306b (voltage drop between contact 306a to contact 307a), sensor 301 is free of magnetic domain walls and thus in the initial state=zero revolutions. When the potential drop of the first turn=50%, only the magnetization state 360° or 720° can be present. Which of the two states is present is determined by measuring the potential drop from contact 306a to contact 307b of the second turn. If the potential drop here is <50%, one revolution was counted, if the potential drop=50%, two revolutions were counted.

FIG. 12 shows the above schematically. In FIG. 12a, the signal of the outermost first turn (denoted W1 in FIG. 12; voltage at contact 307a), and in FIG. 12b, the signal of the second turn (W2; voltage at contact 307b) is plotted against the angle of rotation of the magnetic field. For an ideal sensor, the signal in FIG. 12a would jump from the lower low level to the middle 50% level at exactly 360°. For the second turn, the voltage swing in FIG. 12b would occur exactly at another rotation of 360°, i.e., at 720° of magnetic field rotation. Since the real sensor has a hysteresis, the jumps occur at an angle>360° or >720° (magnetic field rotation in the direction of spiral rotation) or at an angle<360° or <720° (magnetic field rotation opposite to the direction of spiral rotation), depending on the direction of rotation. Thus, it is advantageous if the sensor is not read out in one of the hysteretic angular ranges (310 or 310a) symbolized by rectangles in FIG. 12. These angular ranges have a periodicity of 180°. In the first hysteretic angle range 310a, the voltage signal can take any value between the L-level and the M-level, and in the hysteretic angle ranges 310 any value between the L-level and the H-level.

In order to still be able to read out the revolution counter at any time, a second sensor 301 is advantageously provided, which is positioned rotated by 90° to the first sensor in the magnetic revolution counter. This sensor provides a signal phase-shifted by 90° that can be read out, for example, when the first sensor is in a hysteretic angular range (310 or 310a). If the first sensor can be read out, the second sensor should not be read out, because it is then in one of the hysteretic angular ranges (310 or 310a). Since the hysteresis is <90°, there are also angle ranges in which both sensors may be read out. The information about the angle is supplied e.g. by a common angle sensor, which is not shown, to the readout electronics, which then decides which sensor may be read out.

As soon as one turn in a sensor 301 is free of domain-walls, then the turns further inside are also free of domain-walls, since the magnetic domain walls are successively transported from the outside beginning of the spiral, i.e. from domain wall generator 302, to the end of the spiral. The preferred readout method of sensor 301 provides that 1. an angle sensor controlled readout is performed only when sensor 301 is not in a hysteretic angle range, 2. the voltage signal of the first turn, which joins to the domain wall generator, is read out first, 3. and thereafter, successively the second turn up to the Nth turn are read out. That is, the turns of sensor 301 are read out from the outside to the inside. The reading of the turns can be terminated as soon as a turn provides a low-level voltage signal. The low-level signal means that no domain wall has passed under the read-out single contact, and thus no domain wall can be present in turns that are further inward. In FIG. 12, for example, it is sufficient to read out only the first turn at 270° magnetic field rotation, since this is in the low-level state. At 450° magnetic field rotation, the first turn is in the median state, so that the second turn must also be read out, which is in the low level state at this angle. Only at a magnetic field rotation of 720°, both turns are in the M-state. Even this first embodiment of the type 2 revolution counter has several advantages over the known prior art: 1. By measuring the potential drop in each turn, the potential swing that can be measured there is independent of the number of revolutions. As a result, the number of countable turns is no longer limited to about ten revolutions by the magnitude of the GMR effect. The only limitation is due to manufacturing, because each turn lengthens the sensor 301 and thus increases the probability that the spiral, due to a defect, is interrupted. Spiral lengths which can be realized with a good yield allow sensors, which could count 40-50 revolutions, which could be evaluated however no more and/or not sufficiently exact, according to the teaching of the EP 1 740 909 B1. 2. Another advantage is that in other preferred embodiments it is no longer necessary to connect four spirals together in a Wheatstone bridge, but due to the type of connection, one spiral alone as a sensor, like a Wheatstone bridge, provides a signal that is independent of temperature. 3. Another special advantage is that sensor 301 may be over-twisted. In fact, when using four spirals connected in a Wheatstone bridge, there is the major problem that when over-twisted, the domains located in the innermost spiral arm migrate to the ends of the spirals and disappear. If this happens for all spirals of a Wheatstone bridge, defined ratios are obtained again. However, if this does not occur at all four spirals, which cannot be ruled out in principle, the characteristic is changed in an undefined manner and the sensor no longer provides valid signals. For this reason, the Wheatstone bridge solution according to the state of the art should always have a mechanical stop that reliably prevents over-twisting. However, the solution proposed here works even with only one spiral, so that a mechanical stop can therefore be omitted.

A second embodiment of the revolution counter type 2 provides for the elongated spiral to be distorted into a symmetrical rhombus, in which each turn consists of four strip segments, each of which is arranged behind the other at an angle of 90°, and in which two strip segments respectively are wired as a voltage divider or Wheatstone half-bridge. FIG. 13 shows such a sensor 311. Sensor 311 has a domain wall generator 312, to which in this example 4N+1=9 strip segments (313a to 313i) with 4N=8 curvatures (314a to 314h) are connected with N=2 turns. In practical implementation, these curvatures have curvature radiuses in the order of e.g. 1 µm, which is therefore not illustrated separately. Two comparatively large first contacts 316a and 316b are used for feed of potential. In the example, individual contacts 317a and 317b are provided in the curvatures on the left, between first contacts 316a and 316b, each contacting only one turn.

Sensor 311 is read out by determining the potential difference between one of the two large contacts 316a or 316b and the contacts 317a and 317b sequentially or in parallel (if, for example, N AD converters for measuring the voltage potential are provided) to measure the potential drops in the strip segments (313e and 313i, respectively). Preferred embodiments of this second embodiment of the type 2 revolution counter, which are described further below, envisage that strip segments 313a to 313i are of equal length between all electrical contacts.

In each turn, there are the following four orders of magnetization, exemplified in FIG. 14, in the strip segments on the left between contacts 316a and 316b (shown for 313d and 313e): 1. there is no magnetic domain wall in curvature 314d, and the two elongated strip sections 313d, 313e are magnetized in the clockwise direction; 2. a magnetic domain wall exists in curvature 314d, so that the elongated strip sections 313d and 313e are magnetized to the left (FIG. 14b); 3. no magnetic domain wall exists in curvature 314d, and the two elongated strip sections 313d and 313e are magnetized in the counterclockwise direction (FIG. 14c); 4. a magnetic domain wall exists in curvature 314d, so that the elongated strip sections 313d and 313e are magnetized to the right (FIG. 14d).

Thus, when the magnetization direction of hard magnetic layer 318 in sensor 311 points to the right, as indicated in FIG. 13 (at a preferred angle of 45° with respect to the strips), and the potential drop across strip section 313e is measured, the potential drops for magnetization states 1-4 are as follows: 1. <50%, (L=low), since strip section 313e has a lower resistance than strip section 313d; 2. 50% (M=median), since the resistances of strip sections 313d and 313e are equal; 3. >50%, (H=high), since strip section 313e has a higher resistance than strip section 313d; 4. 50%, since the resistances of strip sections 313d and 313e are equal.

During one full revolution of the external magnetic field, a magnetic 180° domain wall passes through one full turn of sensor 311, thus switching the four magnetization states in this turn in sequence every 90°. The preferred readout principle of this second embodiment of the type 2 revolution counter is similar to the first embodiment of the type 2 revolution counter. Preferably the measurement occurs in a multiplexer-controlled manner, all turns in succession, starting at the first turn after the domain wall generator (contact 317a in curvature 314d). The measurement can be terminated in the turn where for the first time the potential drop is <50%. Generalized for N-turn spirals for counting N revolutions, in this readout principle, the counted number of revolutions stored in a one-to-one magnetization pattern in sensor 311 is: number of revolutions=first number of turns (with low-level signal)−1, or number of revolutions=N if no low-level signal is detected.

FIG. 15 shows this again schematically. In FIG. 15a the potential of the first turn (measured at contact 317a) and in FIG. 15b the potential of the second turn (measured at contact 317b) is plotted against the magnetic field rotation. For an ideal sensor, the signal in FIG. 15a would first jump from the lower low level to the middle 50% level at exactly 360°. For the second turn, the jump in FIG. 15b would occur for the first time at exactly 720° magnetic field rotation after another 360°. After the first signal jump, another signal jump occurs every 90° as the magnetic domain wall is transported to the next bend, thus re-magnetizing the intervening strip. In an ideal sensor, signal jumps would occur in the first turn at 450° magnetic field rotation from the 50% level to the high level, at 540° magnetic field rotation from the high level to the 50% level, and at 630° magnetic field rotation from the 50% level to the low level. The signal is thus periodic with a periodicity of 360° from the first revolution (360°). In the second turn, the signal is periodic from the second revolution (720°). Since the real sensor switches hysteretically, the first jumps occur at an angle>360° or >720° (magnetic field rotation in the direction of spiral rotation) or at an angle<360° or <720° (magnetic field rotation opposite to the direction of spiral rotation), depending on the direction of rotation. As a result, sensor 311 should preferably not be read out in the hysteretic angle ranges where it switches from the low level to the 50% level.

In FIG. 15, the hysteretic angle ranges are symbolized by rectangles 320, 321. In order to still be able to read out the revolution counter at any time, either a second sensor 311 is required, which is positioned rotated by 90° with respect to the first sensor in the magnetic revolution counter, or the sensor 311 is preferably provided with further individual contacts (317*c* and 317*d*) in the curvatures (314*b* and 314*f*), as shown in FIG. 16. These two solutions provide two signals that are phase-shifted by 180°.

FIG. 17 schematically shows the sensor signals when sensor 311 according to FIG. 16 is read out on both sides. In FIG. 17*a*) and FIG. 17*b*) the signals of the first turn and in FIG. 17*c*) and FIG. 17*d*) the signals of the second turn are plotted:—FIG. 17*a*) shows the voltage signal of contact 317*c*, where the first signal jump occurs at 180°,—FIG. 17*b*) shows the voltage signal of contact 317*a*, hereto phase-shifted by 180°, where the first signal jump occurs at 360°,—FIG. 73*c*) shows the voltage signal of contact 317*d*, for which the first signal jump occurs at 540°,—FIG. 17*d*) shows the voltage signal of contact 317*b*, hereto phase-shifted by 180°, for which the first signal jump occurs at 720°. The signal of contact 317*d* is in phase with the signal of contact 317*c* from 540° magnetic field rotation, and the signal of contact 317*b* is in phase with the signal of contact 317*a* from 720° magnetic field rotation. Due to the phase shift of 180° between the voltage signals of the left contacts (317*a* and 317*b*) to the voltage signals of the right contacts (317*c* and 317*d*), this sensor can advantageously always be read out without the need for a separate second sensor.

The readout principle of sensor 311 checks whether a threshold value 319 between low-level state and 50% level (median-level) is exceeded. The low-level signal means that no domain wall has passed under the read-out single contact and thus no domain wall is present in turns further inside. The voltage signal of this contact must not be read out only if the magnetic field rotation is in a hysteretic angle range 320 where the voltage signal switches from the low-level state to the M-level state. Otherwise, this voltage signal may always be read out, even in the hysteretic angular ranges 321 where the voltage signal switches from the M-level to the high-level. Since all voltage values between M-level and H-level are above the threshold 319 to be detected, the relevant information that a domain wall has passed the relevant individual contact is always given. Thus, the phase shift of the voltage signals between left and right contacts in sensor 311 allows the voltage signals to be read out at any time either via the left or via the right individual contacts. This means that the magnetic revolution counter only requires one sensor 311 with individual contacts on the left and right, instead of two sensors 311 with individual contacts either on the left or right in sensor 311 or with two sensors 301 according to the first embodiment of the type 2 revolution counter (FIG. 10).

Another advantage of this second embodiment of the type 2 revolution counter is that the 180° domain wall runs into the next strip every 90° magnetic field rotation. This makes the hysteresis intrinsically present in the real sensor narrower than in the sensor according to the first embodiment of the invention. In this solution, the magnetic domain wall runs into the adjacent strip only for every 180° of magnetic field rotation, so that the hysteresis is larger for the same magnetic field. As a result, from the theoretically usable working window Hmin to Hmax, in which the sensor counts without errors, the upper half can be used in the second embodiment of the type 2 revolution counter, and only the upper third in the first embodiment. Hmin denotes the magnetic field at which the domain walls are transported through the spiral without error, i.e. are not pinned unintentionally at defects. Hmax is the magnetic field at which a magnetic domain wall is just not formed uncontrollably in the strip.

FIG. 18 shows an embodiment of the sensor in which the individual contacts 337*a* and 337*b* are formed such that the long straight webs between them have the same length for all parts of the spiral. This has the advantage that the current load is identical for all branches. FIG. 18 is self-explanatory and therefore requires no further explanation.

Another embodiment shown in FIG. 19 provides that the rhombus described above has within one turn at least one angle deviating from 90°.

Preferred embodiments provide for symmetrical rhombi with alternating obtuse and acute angles, e.g. 25°/155°/25°/155°. The preferred embodiment of these variants of the type 2 revolution counter provides that the reference direction 338 extends along the long side of the rhombus and the individual contacts are positioned at the obtuse angles. This makes better use of the GMR effect than the second solution (90% of the GMR stroke is available at an acute angle of 25° instead of 71% at an angle of 90°). Due to the angular difference between acute and obtuse angles in the rhombus, a "geometric hysteresis" is built into the sensor signal corresponding to the difference between the two angles. The sensor in FIG. 19 has the special feature that contacts 336*a* and 336*b* of FIG. 18 are now also designed individually for each loop. This gives the user the option to design as common electrodes either the electrodes at 336*a* and 336*b* or at 337*a* or 337*b*. This does not lead to a fundamentally different characteristic and can also be used with the solution shown in FIG. 18.

A further embodiment of the type 2 revolution counter, as shown in FIG. 20, provides that in addition to the sensor, one or more individual strips 339*a* and 339*b* separated from the rest of the spiral are provided, which in the example are each positioned parallel to the strip 333*a* and 333*b* and/or 333*c* and 333*d*. These strips cannot be re-magnetized due to the lack of connection to the domain wall generator 332, i.e. the magnetization of the sensor layer in these strips always points in the same direction. As a result, the center contact exhibits the potential drop of 50% when the potential is applied to its ends, like sensor 31 or 311 in the previous examples. This signal can serve as a reference signal when measuring the potential drops in the individual turns of the sensor.

Further variants of the type 2 revolution counter provide that instead of the sensor shown in FIG. 10, a variant is used in which individual contacts are provided on both sides of the spiral in all curvatures. This sensor provides two signals which are 180° out of phase, similar to the second variant with individual contacts on both sides. These signals are useful if it is intended to use a 180° angle sensor instead of a 360° angle sensor.

The type 2 revolution counter 301, 311, 331 described with reference to FIGS. 10 to 20 can be used—alternatively or in addition to the use of the type 1 revolution counter (described above with reference to FIGS. 21 to 30*b*)—in particular as a first magnetic sensor 131 (FIG. 2) for the apparatus 100, 100*a*, 100*b*, 100*c*, 100*d* according to the embodiments. For example, revolution counter 301, 311, 331 of type 2 can detect a radial magnetic field rotating relative to sensor device 130 (FIG. 2) as can be generated by magnet arrangement 120 (FIG. 2) (e.g., during axial movement of sensor device 130) and count the corresponding revolutions, from which information about a position of sensor device 130 along the z-coordinate of support 110 can be determined. Thus, when revolution counter 301, 311, 331 of type 2 (in the form of sensor 131) is moved along the z-coordinate of support 110, this is detected by revolution counter 301, 311, 331 in the form of counted (relative) revolutions of the magnetic field whose radial component(s) vary along the z-coordinate of support 110. This recorded number of revolutions is thereby retained in revolution counter 301, 311, 331 even if apparatus 100 is deactivated, or if a defect occurs in the power supply to the apparatus.

Further details of the type 2 revolution counter, which can be combined with one or more of the embodiments described herein, are also described in DE 10 2008 063 226 A1.

FIG. 31 schematically shows a simplified flow diagram of a method according to one embodiment. In step 200, sensor device 130 (FIGS. 2, 3) is moved along longitudinal direction 112 of support 110, e.g. using sliding guide 130a, 130b. In step 202, an output signal of first magnetic sensor 131, and in step 204, an output signal of second magnetic sensor 132 is determined and evaluated by means of evaluation unit 136 (FIG. 3), in particular to derive the position of sensor device 130 along the z coordinate. Apparatus 100, 100a, 100b, 100c, 100d can advantageously be used to provide a displacement transducer or position sensor.

FIG. 32A schematically shows an apparatus 100e according to further preferred embodiments, partially in cross-section when viewed in longitudinal direction, similar to the configuration of FIG. 1. In contrast to FIG. 1, apparatus 100e of FIG. 32A does not have a support 110, but a substantially hollow-cylindrical magnetic element 120, which e.g. is itself sufficiently dimensionally stable and/or is configured for attachment to a target system (not shown in FIG. 32A) for the apparatus 100e. For example, in further preferred embodiments, provision may be made for inserting magnetic element 120 into a corresponding holder or the like that is hollow cylindrical or adapted to the geometry of magnetic element 120, at least in certain regions. In other preferred embodiments, magnetic element 120 may be configured to be stationary and sensor device 130 may be configured to be movable relative thereto (along the longitudinal axis, i.e., perpendicular to the drawing plane of FIG. 32A). Alternatively, sensor device 130 may be configured to be stationary and the magnetic element 120 may be configured to be movable relative thereto (along the longitudinal axis, i.e., perpendicular to the drawing plane of FIG. 32A), which simplifies the electrical connection of sensor device 130. Alternatively, both the sensor device 130 and the magnetic element 120 may be configured to be movable (along the longitudinal axis).

FIG. 32B schematically shows a side view of an apparatus 100f according to further preferred embodiments. In the present case, a (in particular single) magnetic element 122' is provided, which implements the function of the magnet arrangement 120 according to the embodiments, and which is arranged on a surface 2000a of a target system 2000 (e.g. machine tool), in particular arranged in a stationary manner, i.e. fixed. In the present embodiment, sensor device 130 is designed and arranged so as to be (reciprocally) movable relative to magnetic element 122' along longitudinal axis 112 (horizontally in FIG. 32B), cf. block arrows A1, A2.

FIG. 32C schematically shows a side view of an apparatus 100g according to further preferred embodiments. In the present case, a (particularly single) magnetic element 122' is provided, which implements the function of the magnet arrangement 120 according to the embodiments, and which is arranged on a surface 2000a' of a target system 2000' (e.g. part of a machine tool). In the present case, target system 2000' (together with magnetic element 122' arranged thereon) is designed and arranged so as to be (reciprocally) movable along longitudinal axis 112 (horizontally in FIG. 32C), cf. block arrows A1', A2', and sensor device 130 is arranged or fixed in a stationary manner, e.g. on a further (preferably stationary) component 2000" of the target system. This enables a particularly simple electrical connection of sensors 131, 132, for which in particular no cables or signal lines (not shown) have to be moved.

The invention claimed is:

1. An apparatus comprising:
   a magnet arrangement which extends along a longitudinal axis for generating a magnetic field and is configured to generate the magnetic field with at least a first radial magnetic field component varying along the longitudinal axis; and
   a magnetic sensor device which is arranged movably relative to the magnet arrangement along the longitudinal axis and comprises a first magnetic sensor and a second magnetic sensor, wherein the first magnetic sensor is a magnetic revolution counter that counts an integer multiple of a relative revolution of the magnetic sensor device with respect to the at least first radial magnetic field component.

2. The apparatus according to claim 1, wherein the apparatus comprises a support for receiving the magnet arrangement.

3. The apparatus according to claim 2, wherein the support is formed in a substantially hollow cylindrical shape, and wherein the magnet arrangement is arranged radially inside of the support.

4. The apparatus according to claim 3, wherein the magnet arrangement is arranged on a radial inner surface of the support.

5. The apparatus according to claim 4, wherein the at least one magnetic element is arranged at least approximately helically along a or the radially inner surface of a support.

6. The apparatus according to claim 5, wherein the first magnetic sensor configured as a magnetic revolution counter comprises:
   at least one sensor element having a layered structure capable of causing, without a power supply, a change in the magnetization in the sensor element when a magnetic field is moved past the sensor element and storing a plurality of such changes, wherein the sensor element comprises a spiral-shaped structure provided with the layered structure.

7. The apparatus according to claim 2, wherein the support comprises a material and/or a coating with a material which has a relative permeability of at least one of: about 100 or more, about 1000 or more, or about 2000 or more.

8. The apparatus according to claim 1, wherein a) the magnet arrangement can be arranged statically, and wherein in particular the sensor device can be moved relative to the magnet arrangement, or b) the sensor device can be arranged statically, and wherein the magnet arrangement can be moved relative to the sensor device, or c) the magnet arrangement can be moved, and wherein the sensor device also can be moved relative to the magnet arrangement.

9. The apparatus according to claim 1, wherein the first magnetic sensor has a first sensor type, and wherein the second magnetic sensor has a second sensor type different from the first sensor type.

10. The apparatus according to claim 1, wherein the magnet arrangement is configured to generate the magnetic field with the at least one first radial magnetic field component varying along the longitudinal axis and with a second radial magnetic field component varying along the longitudinal axis.

11. The apparatus according to claim 1, wherein the magnet arrangement comprises at least one magnetic element having a substantially ribbon-like basic shape.

12. The apparatus according to claim 1, wherein the first magnetic sensor and the second magnetic sensor are both arranged in a region of the longitudinal axis.

13. The apparatus according to claim 1, wherein the first magnetic sensor and the second magnetic sensor are arranged one behind the other on the longitudinal axis.

14. The apparatus according to claim 1, wherein the second magnetic sensor is a Hall sensor.

15. The apparatus according to claim 1, further comprising an evaluation unit configured to evaluate output signals of the first and second magnetic sensors, wherein the evaluation unit is configured to determine a position of the sensor device with respect to a coordinate, corresponding to the longitudinal axis, of the magnetic element and/or of a support.

16. The apparatus according to claim 1, wherein the first magnetic sensor configured as a magnetic revolution counter comprises a loop-like arrangement provided with N turns, comprising a GMR layer stack, into which magnetic 180° domains can be introduced, stored and read out by measuring the electrical resistance, wherein elongated loop sections are provided at a predeterminable angle with respect to a reference direction impressed in the sensor that are provided, with contacts to which an electrical potential can be applied and which serve serially or in parallel for reading electrical resistance ratios of individual loop sections to further individual contacts provided in curvature regions of the loop-like arrangement.

17. A method for operating an apparatus comprising a magnet arrangement which extends along a longitudinal axis for generating a magnetic field and which is configured to generate the magnetic field with at least a first radial magnetic field component varying along the longitudinal axis, and a magnetic sensor device which is arranged movably relative to the magnet arrangement along the longitudinal axis and which comprises a first magnetic sensor and a second magnetic sensor, the method comprising:

moving the magnetic sensor device along the longitudinal axis relative to the magnet arrangement, wherein the first magnetic sensor is a magnetic revolution counter; and determining an integer multiple of a relative revolution of the magnetic sensor device with respect to the at least one first radial magnetic field component.

18. The method according to claim 17, wherein a Hall sensor is used as the second magnetic sensor.

19. The method of claim 17, wherein at least one component of the magnet arrangement is arranged on the movable element.

20. The method of claim 17, further comprising operating the apparatus in a displacement transducer.

* * * * *